(12) United States Patent
Garnier

(10) Patent No.: US 10,435,820 B2
(45) Date of Patent: Oct. 8, 2019

(54) COMPOSITE ARTICLES COMPRISING METAL CARBIDE FIBERS

(71) Applicant: ADVANCED CERAMIC FIBERS, LLC, Idaho Falls, ID (US)

(72) Inventor: John E. Garnier, Idaho Falls, ID (US)

(73) Assignee: ADVANCED CERAMIC FIBERS, Idaho Falls, ID (US)

( * ) Notice: Subject to any disclaimer, the term of this patent is extended or adjusted under 35 U.S.C. 154(b) by 4 days.

(21) Appl. No.: 15/795,619

(22) Filed: Oct. 27, 2017

(65) Prior Publication Data

US 2018/0051396 A1 Feb. 22, 2018

Related U.S. Application Data

(62) Division of application No. 14/615,685, filed on Feb. 6, 2015, now Pat. No. 9,803,296.

(Continued)

(51) Int. Cl.
*C04B 35/56* (2006.01)
*D01F 9/08* (2006.01)
(Continued)

(52) U.S. Cl.
CPC ............ *D01F 9/08* (2013.01); *C04B 35/56* (2013.01); *C04B 35/565* (2013.01); *C04B 35/6286* (2013.01); *C04B 35/62277* (2013.01); *C04B 35/62897* (2013.01); *C04B 35/806* (2013.01); *C08K 7/04* (2013.01); *D01F 8/00* (2013.01); *C04B 2235/32* (2013.01);
(Continued)

(58) Field of Classification Search
CPC ....... C04B 41/45; C04B 41/50; C04B 41/009; C04B 41/4584
See application file for complete search history.

(56) References Cited

U.S. PATENT DOCUMENTS 2,784,112 A 3/1957 Nicholson
3,028,256 A 4/1962 Simnad
(Continued)

FOREIGN PATENT DOCUMENTS

CA 2421032 4/2002
CN 2700346 Y 5/2005
(Continued)

OTHER PUBLICATIONS

International Search Report and Written Opinion issued in PCT/US2018/041627 dated Sep. 26, 2018.
(Continued)

*Primary Examiner* — Noah S Wiese
(74) *Attorney, Agent, or Firm* — Workman Nydegger

(57) ABSTRACT

A method of producing, from a continuous or discontinuous (e.g., chopped) carbon fiber, partially to fully converted metal carbide fibers. The method comprises reacting a carbon fiber material with at least one of a metal or metal oxide source material at a temperature greater than a melting temperature of the metal or metal oxide source material (e.g., where practical, at a temperature greater than the vaporization temperature of the metal or metal oxide source material). Additional methods, various forms of carbon fiber, metal carbide fibers, and articles including the metal carbide fibers are also disclosed.

20 Claims, 2 Drawing Sheets

Related U.S. Application Data

(60) Provisional application No. 61/941,001, filed on Feb. 18, 2014.

(51) Int. Cl.

| | | |
|---|---|---|
| *D01F 8/00* | (2006.01) | |
| *C08K 7/04* | (2006.01) | |
| *C04B 35/565* | (2006.01) | |
| *C04B 35/622* | (2006.01) | |
| *C04B 35/628* | (2006.01) | |
| *C04B 35/80* | (2006.01) | |
| *D01F 11/12* | (2006.01) | |

(52) U.S. Cl.
CPC ............... *C04B 2235/3201* (2013.01); *C04B 2235/3203* (2013.01); *C04B 2235/3206* (2013.01); *C04B 2235/3208* (2013.01); *C04B 2235/3217* (2013.01); *C04B 2235/3224* (2013.01); *C04B 2235/3225* (2013.01); *C04B 2235/3227* (2013.01); *C04B 2235/3229* (2013.01); *C04B 2235/3232* (2013.01); *C04B 2235/3239* (2013.01); *C04B 2235/3241* (2013.01); *C04B 2235/3244* (2013.01); *C04B 2235/3251* (2013.01); *C04B 2235/3256* (2013.01); *C04B 2235/3258* (2013.01); *C04B 2235/3262* (2013.01); *C04B 2235/3272* (2013.01); *C04B 2235/3409* (2013.01); *C04B 2235/3418* (2013.01); *C04B 2235/40* (2013.01); *C04B 2235/402* (2013.01); *C04B 2235/404* (2013.01); *C04B 2235/405* (2013.01); *C04B 2235/421* (2013.01); *C04B 2235/428* (2013.01); *C04B 2235/5248* (2013.01); *C04B 2235/5252* (2013.01); *C04B 2235/5264* (2013.01); *C04B 2235/5284* (2013.01); *C04B 2235/5292* (2013.01); *D01F 11/123* (2013.01); *D01F 11/127* (2013.01); *D10B 2101/12* (2013.01); *D10B 2101/14* (2013.01)

(56) References Cited

U.S. PATENT DOCUMENTS

| | | | |
|---|---|---|---|
| 3,166,614 A | 1/1965 | Taylor | |
| 3,175,884 A | 3/1965 | Kuhn | |
| 3,246,950 A | 4/1966 | Gruber | |
| 3,369,920 A | 2/1968 | Bourdeau et al. | |
| 3,386,840 A | 6/1968 | Gruber | |
| 3,415,625 A | 12/1968 | Babl et al. | |
| 3,427,222 A | 2/1969 | Biancheria et al. | |
| 3,447,952 A | 6/1969 | Hertl | |
| 3,488,291 A | 1/1970 | Hardy et al. | |
| 3,519,472 A | 7/1970 | Dyne et al. | |
| 3,535,080 A | 10/1970 | Pyl | |
| 3,725,533 A | 4/1973 | Economy et al. | |
| 3,764,550 A | 10/1973 | Block et al. | |
| 3,808,087 A | 4/1974 | Milewski et al. | |
| 3,813,340 A | 5/1974 | Knippenberg et al. | |
| 3,825,469 A | 7/1974 | Economy et al. | |
| 3,925,151 A | 12/1975 | Klepfer | |
| 3,932,594 A | 1/1976 | Gortsema | |
| 4,008,090 A | 2/1977 | Miyake et al. | |
| 4,013,503 A | 3/1977 | Knippenberg et al. | |
| 4,022,662 A | 5/1977 | Gordon et al. | |
| 4,107,276 A | 8/1978 | Schwetz et al. | |
| 4,141,948 A | 2/1979 | Laskow et al. | |
| 4,158,687 A | 6/1979 | Yajima et al. | |
| 4,209,334 A | 6/1980 | Panzera | |
| 4,225,355 A | 9/1980 | Galasso et al. | |
| 4,284,612 A | 8/1981 | Horne, Jr. et al. | |
| 4,294,788 A | 10/1981 | Laskow et al. | |
| 4,406,012 A | 9/1983 | Gordon et al. | |
| 4,445,942 A | 5/1984 | Cheng et al. | |
| 4,473,410 A | 9/1984 | Grubb et al. | |
| 4,566,700 A | 1/1986 | Shiembob | |
| 4,626,461 A | 12/1986 | Prewo et al. | |
| 4,707,330 A | 11/1987 | Ferrari | |
| 4,731,298 A | 3/1988 | Shindo et al. | |
| 4,749,556 A | 6/1988 | Parrish et al. | |
| 4,756,895 A | 7/1988 | Boecker et al. | |
| 4,770,935 A | 9/1988 | Yamamura et al. | |
| 4,784,839 A | 11/1988 | Bachelard et al. | |
| 4,784,978 A | 11/1988 | Ogasawara et al. | |
| 4,851,375 A | 7/1989 | Newkirk et al. | |
| 4,853,196 A | 8/1989 | Koshida et al. | |
| 4,859,503 A | 8/1989 | Bouix et al. | |
| 4,864,186 A | 9/1989 | Milewski et al. | |
| 4,889,686 A | 12/1989 | Singh et al. | |
| 4,894,203 A | 1/1990 | Adamson | |
| 4,908,340 A * | 3/1990 | Frechette ............. C04B 35/117 264/DIG. 19 | |
| 4,921,725 A | 5/1990 | Bouix et al. | |
| 4,948,573 A | 8/1990 | Nadkarni et al. | |
| 4,948,763 A | 8/1990 | Hayashida et al. | |
| 4,963,286 A | 10/1990 | Coyle et al. | |
| 4,971,673 A | 11/1990 | Weisweiler et al. | |
| 4,988,564 A | 1/1991 | D'Angelo et al. | |
| 5,020,584 A | 6/1991 | Aghajanian et al. | |
| 5,026,604 A | 6/1991 | Thebault | |
| 5,063,107 A | 11/1991 | Birchall et al. | |
| 5,067,999 A | 11/1991 | Streckert et al. | |
| 5,068,154 A | 11/1991 | Mignani et al. | |
| 5,116,679 A | 5/1992 | Nadkarni et al. | |
| 5,135,895 A * | 8/1992 | Frechette .......... C04B 35/62227 264/DIG. 19 | |
| 5,182,077 A | 1/1993 | Feinroth | |
| 5,190,737 A | 3/1993 | Weimer et al. | |
| 5,202,105 A | 4/1993 | Boecker et al. | |
| 5,230,848 A | 7/1993 | Wallace et al. | |
| 5,238,711 A | 8/1993 | Barron et al. | |
| 5,254,142 A | 10/1993 | Johansson et al. | |
| 5,268,946 A | 12/1993 | Bryan et al. | |
| 5,275,984 A | 1/1994 | Carpenter et al. | |
| 5,294,489 A | 3/1994 | Luthra et al. | |
| 5,304,397 A | 4/1994 | Holzl et al. | |
| 5,324,494 A | 6/1994 | Glatzmaier | |
| 5,330,838 A | 7/1994 | Dyer et al. | |
| 5,336,350 A | 8/1994 | Singh | |
| 5,340,417 A | 8/1994 | Weimer et al. | |
| 5,354,527 A | 10/1994 | Frechette et al. | |
| 5,364,660 A * | 11/1994 | Gabor ................... C04B 41/009 427/255.24 | |
| 5,366,943 A | 11/1994 | Lipowitz et al. | |
| 5,368,938 A | 11/1994 | Holzl et al. | |
| 5,383,228 A | 1/1995 | Armijo et al. | |
| 5,404,836 A | 4/1995 | Milewski | |
| 5,434,897 A | 7/1995 | Davies | |
| 5,436,042 A | 7/1995 | Lau et al. | |
| 5,449,421 A | 9/1995 | Hamajima et al. | |
| 5,460,637 A | 10/1995 | Connolly et al. | |
| 5,501,906 A | 3/1996 | Deve | |
| 5,547,512 A | 8/1996 | Gabor et al. | |
| 5,552,352 A | 9/1996 | Brun et al. | |
| 5,602,062 A | 2/1997 | Sato et al. | |
| 5,618,510 A | 4/1997 | Okada et al. | |
| 5,676,918 A | 10/1997 | Okada et al. | |
| 5,814,840 A | 9/1998 | Woodall et al. | |
| 5,922,300 A | 7/1999 | Nakajima et al. | |
| 5,962,103 A | 10/1999 | Luthra et al. | |
| 5,997,832 A | 12/1999 | Lieber et al. | |
| 6,022,515 A | 2/2000 | Stole et al. | |
| 6,024,898 A | 2/2000 | Steibel et al. | |
| 6,030,698 A | 2/2000 | Burchell et al. | |
| 6,040,008 A | 3/2000 | Sacks | |
| 6,110,279 A | 8/2000 | Kito et al. | |
| 6,113,982 A * | 9/2000 | Claar ................... C04B 35/652 427/248.1 | |
| 6,261,509 B1 | 7/2001 | Barnard et al. | |
| 6,270,573 B1 | 8/2001 | Kitabatake et al. | |
| 6,316,051 B2 | 11/2001 | Okada | |

(56) References Cited

U.S. PATENT DOCUMENTS

| | | | |
|---|---|---|---|
| 6,322,889 | B1 | 11/2001 | Lara-Curzio et al. |
| 7,041,266 | B1 | 5/2006 | Angier et al. |
| 7,083,771 | B2 | 8/2006 | Angier et al. |
| 7,125,514 | B2 | 10/2006 | Okamura et al. |
| 7,297,368 | B2 * | 11/2007 | Williams .............. C04B 35/56 427/249.1 |
| 7,341,702 | B2 | 3/2008 | Pultz et al. |
| 7,687,016 | B1 | 3/2010 | DiCarlo et al. |
| 7,700,202 | B2 | 4/2010 | Easler et al. |
| 8,940,391 | B2 | 1/2015 | Garnier et al. |
| 9,199,227 | B2 | 12/2015 | Garnier et al. |
| 9,272,913 | B2 | 3/2016 | Garnier et al. |
| 9,275,762 | B2 | 3/2016 | Garnier et al. |
| 9,803,296 | B2 | 10/2017 | Garnier et al. |
| 2002/0033545 | A1 | 3/2002 | Marlowe |
| 2002/0058107 | A1 * | 5/2002 | Fareed ................. B32B 18/00 427/255.39 |
| 2004/0126306 | A1 | 7/2004 | Ochiai et al. |
| 2006/0039524 | A1 | 2/2006 | Feinroth et al. |
| 2006/0051281 | A1 | 3/2006 | Pradhan et al. |
| 2006/0140838 | A1 | 6/2006 | Pultz et al. |
| 2006/0227924 | A1 | 10/2006 | Hallstadius et al. |
| 2007/0064861 | A1 | 3/2007 | Sterbentz |
| 2007/0138706 | A1 | 6/2007 | Metzger et al. |
| 2007/0248760 | A1 | 10/2007 | Chmelka et al. |
| 2009/0032178 | A1 | 2/2009 | Feinroth |
| 2009/0318280 | A1 | 12/2009 | Mohammadi et al. |
| 2010/0120604 | A1 | 5/2010 | Easler et al. |
| 2011/0135558 | A1 | 6/2011 | Ma et al. |
| 2012/0087457 | A1 | 4/2012 | Garnier et al. |
| 2012/0088088 | A1 | 4/2012 | Garnier et al. |
| 2013/0010914 | A1 | 1/2013 | Garnier et al. |
| 2013/0010915 | A1 | 1/2013 | Garnier et al. |
| 2013/0048903 | A1 | 2/2013 | Garnier et al. |
| 2016/0012252 | A1 | 1/2016 | Deleeuw et al. |

FOREIGN PATENT DOCUMENTS

| | | |
|---|---|---|
| EP | 0603888 | 6/1994 |
| JP | 50038700 | 4/1975 |
| JP | 06192917 | 7/1994 |
| JP | 2010143771 | 7/2010 |
| WO | WO9515564 | 6/1995 |
| WO | WO 2009046293 | 4/2009 |
| WO | WO 2012/048066 | 4/2012 |
| WO | WO 2012/048071 | 4/2012 |
| WO | WO 2013/070293 | 5/2013 |
| WO | 2014049221 | 9/2013 |

OTHER PUBLICATIONS

"Abradable Coatings used for Gas Path Seals in Turbine Engines." Vac Aero International, Inc. Web. Accessed Dec. 3, 2014. http://vacaero.com/information-resources/vac-aero-news-and-training/products-news-training/633-abradable-coatings-for-gas-path-seals-in-turbine-engines.html.
Al-Olayyan, Y., et al., The Effect of Zircaloy-4 Substrate Surface Condition on the Adhesion Strength and Corrosion of SiC Coatings, Journal of Nuclear Materials, 2005, pp. 109-119, vol. 346, Elsevier B.V.
"An Innovative Ceramic Corrosion Protection System for Zircaloy Cladding," Year 3—4th Quarter Report (+6), NERI Research Project No. DE-FG03-995F21882, Feb. 2003.
Belitskus, David, "Fiber and Whisker Reinforced Ceramics for Structural Application", Technology & Engineering, pp. 81-83 and 86-90, 1993.
Bye et al., "Occurrence of airborne silicon carbide fibers during industrial production of silicon carbide," Scand J. Work Environ health 11 (1985) 111-15.
Chambers et al., "Development and Testing of PRD-66 Hot Gas Filters," DOE/ME/31214-97/C0734, Advanced Coal-Fired Power Systems '96 Review Meeting, Morgantown, West Virginia, Jul. 16-18, 1996, 8 pages.
Dacic et al., "Thermodynamics of gas phase carbothermic reduction of boron-anhydride," Journal of Alloyes and Compounds 413 (2006) 198-205.
Garnier, John, et al., Ex-Reactor Determination of Thermal Gap Conductance Between Uranium Dioxide and Zircaloy-4, Stage II: High Gas Pressure, Prepared for Nuclear Regulatory Commission, NUREG/CR-0330 PNL-3232, vol. 2, Jul. 1980, 78 pages.
Haibo et al., "Synthesis of a silicon carbide coating on carbon fibers by deposition of a layer of pyrolytic carbon and reacting it with silicon monoxide," Carbon 46 (2008) 1339-1344.
"Hexoloy SA Silicon Carbide, Technical Data," Saint-Gobain Advanced Cermics, 2003, 4 pages.
"Hi-Nicalon Ceramic Fiber," COI Ceramics, Inc., Jan. 2006, 2 pages.
"Hi-Nicalon Type S Ceramic Fiber," COI Ceramics, Inc., Jan. 2006, 2 pages.
"High Performance Synthetic Fibers for Composites," National Materials Advisory Board, Commission on Engineering and Technical Systems, National Research Council, Publication NMAB-458, Apr. 1992, 142 pages.
Jay Aseelan et al., "In Situ Formation of Silicon Carbide Nanofibers on Cordierite Substrates," J. Am. Ceram. Soc., 90 [5] 1603-1060 (2007).
Milewski, "Growth of Beta-Silicon Carbide Whiskers by the VLS Process", Journal of Materials Science 20, 1985, pp. 1160-1166.
Mortensen, Andrew, "Concise Encyclopedia of Composite Materials", Technology & Engineering, pp. 866-869, Dec. 8, 2003.
Okada et el., "Preparation of Silicon Carbide Fiber from Activated Carbon Fiber and Gaseous Silicon Monoxide", Ceramic Engineering & Science Proceedings, 1995, pp. 45-54.
Okada et el., "Preparation of Silicon Carbide Fiber from Activated Carbon Fiber and Gaseous Silicon Monoxide", Communications of the American Ceramic Society, Jun. 1994, pp. 1691-1693.
PCT International Search Report and Written Opinion of the International Searching Authority for PCT/US11/55025, dated Feb. 27, 2012, 7 pages.
PCT International Search Report and Written Opinion of the International Searching Authority for PCT/US11/55031, dated Feb. 13, 2012, 10 pages.
PCT International Search Report and Written Opinion of the International Searching Authority for PCT/US12/50736, dated Jun. 10, 2013, 4 pages.
Ryan et al., "The Conversion of Cubic to Hexagonal Silicon Carbide as a Function of Temperature and Pressure" USAF, 1967.
Schricker, Bob, "Using Fiber Metal Abradable Seals in Aerospace Turbine Applications." Defense Tech Briefs. Technetics Group, EnPro Industries companies, Oct. 1, 2011. Web. Accessed Dec. 3, 2014. https://www.techneticsgroup.com/bin/AbradableSeals_AerospaceApplications.pdf.
"Silar® SiC Whiskers for Ceramic Systems", www.acm-usa.com/Pages/Materials/details.apx?fsid=0, 1 pg.
"Sylramic SiC Fiber," COI Ceramics, Inc., Jan. 2006, 2 pages.
"UBE Tyranno Fibers," Engineering Ceramics, 2005, 3 pages.
Wikipedia entry, "Activated Carbon", http://en.wikipedia.org/wiki/Activated_carbon, Accessed Sep. 25, 2013, 15 pages.
Wikipedia entry, "Vapor-liquid-solid method", http://en.wikipedia.org/wiki/Vapor-Liquid-Solid<method, Accessed Oct. 9, 2013, 7 pages.
Wilson, Scott, "Ensuring Tight Seals", Sulzer Innotec Abradable Test Facility. Sulzer Innotec, Feb. 2007. Web. Accessed Dec. 3, 2014. http://www.sulzer.com/en/-/media/Documents/Cross_Division/Str/2007/2007_2_23_wilson_e.pdf.
Yang, et al., "Microstructure and Mechanical Properties of C/CeZrCeSiC Composites Fabricated by Reactive Melt Infiltration with Zr, Si Mixed Powders" in the Journal of Material Science Technologies, Aug. 2013, vol. 29, Issue 8, pp. 702-710.
U.S. Appl. No. 12/901,309, Apr. 20, 2011, Restriction Requirement.
U.S. Appl. No. 12/901,309, Jun. 13, 2011, Office Action.
U.S. Appl. No. 12/901,309, Oct. 27, 2011, Final Office Action.
U.S. Appl. No. 12/901,309, Jan. 12, 2012, Advisory Action.
U.S. Appl. No. 12/901,309, Apr. 2, 2012, Office Action.
U.S. Appl. No. 13/215,967, Mar. 29, 2013, Restriction Requirement.
U.S. Appl. No. 12/901,309, Apr. 16, 2013, Final Office Action.

(56) References Cited

OTHER PUBLICATIONS

U.S. Appl. No. 13/215,967, Apr. 25, 2013, Office Action.
U.S. Appl. No. 12/901,326, Aug. 12, 2013, Restriction Requirement.
U.S. Appl. No. 12/901,309, Nov. 7, 2013, Office Action.
U.S. Appl. No. 12/901,326, Nov. 18, 2013, Office Action.
U.S. Appl. No. 13/215,967, Jan. 3, 2014, Final Office Action.
U.S. Appl. No. 12/901,309, Jun. 30, 2014, Office Action.
U.S. Appl. No. 12/901,326, Sep. 11, 2014, Final Office Action.
U.S. Appl. No. 12/901,309, Sep. 16, 2014, Notice of Allowance.
U.S. Appl. No. 13/215,967, Apr. 24, 2015, Office Action.
U.S. Appl. No. 12/901,326, May 15, 2015, Office Action.
U.S. Appl. No. 13/215,967, Jul. 29, 2015, Notice of Allowance.
U.S. Appl. No. 14/570,927, Oct. 20, 2015, Notice of Allowance.
U.S. Appl. No. 12/901,326, Oct. 26, 2015, Notice of Allowance.
U.S. Appl. No. 14/615685, Jan. 26, 2017, Office Action.
U.S. Appl. No. 14/615685, Jun. 30, 2017, Notice of Allowance.
U.S. Appl. No. 16/030,145, filed Jul. 9, 2018, Garnier, et al.
"Ceramic Fibers and Coatings: Advanced Materials for the Twenty-First Century" The National Academies Press, 1998, Chapter 6: Interfacial Coatings.
Ding, et al. "Dip-coating of boron nitride interphase and its effects on mechanical properties of SiCf/SiC composites" Materials Science and Engineering A, 2012.
Low, "Advances in Ceramic Matrix Composites" Jan. 20, 2018 pp. 12-15.
Naslain, et al. "Fiber-Reinforced Ceramic Matrix Composites: State of the Art, Challenge and Perspective" Kompozyty (Composites) 5(2005)1, France.
Sacks, et al. "Silicon Carbide Fibers with Boron Nitride Coatings" in 24th Annual Conference on Composites, Advanced Ceramics, Materials and Structures—B, Sep. 28, 2009, pp. 275-277.
Shi, et al. "Synthesis of Few-Layer Hexagonal Boron Nitride Thin Film by Chemical Vapor Deposition" American Chemical Society, 2010, vol. 10, pp. 4134-4139.
Wang, et al. "KD-S SiCf/SiC composites with BN interface fabricated by polymer infiltration and pyrolysis process" Journal of Advanced Ceramics, 2018, 7(2).
Wilson, "Oxidation of SiC/BN/SiC Ceramic Matrix Composites and their Constituents".
Wing "Residual Stresses and Oxidation of Silicon Carbide Fiber Reinforced Silicon Carbide Composites" A dissertation, University of Michigan, 2016.
U.S. Appl. No. 14/954,518, Aug. 30, 2017, Office Action.
U.S. Appl. No. 14/954,518, May 18, 2018, Office Action.
Baskaran, et al. "Fibrous Monolithic Ceramics: III, Mechanical Properties and Oxidation Behavior of the Silicon Carbide/Boron Nitride System" Journal of the American Ceramic Society, vol. 77, Issue 5, May 1994, pp. 1249-1255.
Chen, et al. "Carbothermal Synthesis of Boron Nitride Coatings on Silicon Carbide" Journal of American Ceramic Society, Dec. 20, 2004.
Das, et al. "Carbothermal synthesis of boron nitride coating on PAN carbon fiber" Journal of the European Ceramic Society, vol. 29, Issue 10, Jul. 2009, pp. 2129-2134.
Dicarlo, et al. "SiC/SiC Composites for 1200 C and Above" Nasa/TM, Dec. 2004.
Frueh, et al. "Caton fiber reinforced ceramic matrix composites with an oxidation resistant boron nitride interface coating" Ceramics International, May 21, 2018.
Han "Anisotropic Hexagonal Boron Nitride Nanomaterials: Synthesis and Applications" Nanotechnologies for the Life Sciences, Oct. 2010.
Lamouroux, et al. "Oxidation-resistant carbon-fiber-reinforced ceramic-matrix composites" Composites Science and Technology, vol. 59, Issue 7, May 1999, pp. 1073-1085.
Li, et al. "Boron nitride coatings by chemical vapor deposition from borazine" Surface and Coatings Technology, Mar. 2011, 205(12) pp. 3736-3741.
Li, et al. "Preparation and characterization of boron nitride coatings on carbon fibers from borazine by chemical vapor deposition" Applied Surface Science, vol. 257, Issue 17, Jun. 15, 2011, pp. 7752-7757.
Liu, et al. "Borazine derived porous boron nitride—boron nitride composites fabricated by precursor infiltration and pyrolysis" Ceramics International, 40(7) pp. 9235-9240.
McFarland, et al. "Boria Fluxing of SiC in Ceramic Matrix Composite Aeropropulsion Applications" The Electrochemical Society, 2015.
Mu, et al. "Effects of BN/SiC dual-layer interphase on mechanical and dielectric properties of SiCf/SiC composites" Ceramics International, Mar. 2014, 40(2), pp. 3411-3418.
Opila, "Oxidation and Volatilization of SiC in a Hydrogen-Rich Rocket Engine Environment" The Electrochemical Society, 2007.
Opila, et al. "High Temperature Degradation of BN-Coated SiC Fibers in Ceramic Matrix Composites" The Electrochemical Society, 2011.
Opila, et al. "Hot Corrosion of SiC/BN/SiC Composites" The Electrochemical Society, 2015.
Opila, et al. "Molten Salt Corrosion of SiC Fibers" The Electrochemical Society, 2016.
Sabelkin, et al. "Fatigue and creep behaviors of a SiC/SiC composite under combustion and laboratory environments" Journal of Composite Materials, Aug. 27, 2015.
Sabelkin et al. "High-temperature thermal barrier-coated Sylramic-iBN/pyrolytic carbon/chemical vapor infiltration silicon carbide ceramic matrix composite behavior in a combustion environment" Journal of Composite Materials, Aug. 10, 2017.
Shen, et al. "Characterization of Dip-Coated Boron Nitride on Silicon Carbide Fibers" Journal of the American Ceramic Society, Apr. 1994.
Solozhenko, et al. "Refined Phase Diagram of Boron Nitride" Journal of Physical Chemistry B, 1999, vol. 103 pp. 2903-2905.
Suzuki, et al. "Uniformization of Boron Nitride Coating Thickness by Continuous Chemical Vapor Deposition Process for Interphase of SiC/SiC Composites" Journal of the Ceramic Society of Japan, vol. 111, No. 12, pp. 865-871, 2003.
Wei, et al. "Synthesis of BN coatings on carbon fiber by dip coating" Surface and Interface Analysis, Jul. 29, 2016.
Yang, et al. "Processing-temperature dependent micro-and macro-mechanical properties of SiC fiber reinforced SiC matrix composites" Composites Part B: Engineering, vol. 129, Nov. 15, 2017, pp. 152-161.
Zhou, et al. "Effects of dip-coated BN interphase on mechanical properties of SiCf/SiC composites prepared by CVI process" Transactions of Nonferrous Metals Society of China, May 2014, 24(5), pp. 1400-1406.
U.S. Appl. No. 16/261,246, filed Jan. 29, 2019, Garnier, et al.
Chiu et al. "SiC nanowires in large quantities: Synthesis, band gap characterization, and photoluminescence properties" Journal of Crystal Growth, 311 (2009) pp. 1036-1041.
Abstract Only Han et al. "Continuous synthesis and characterization of silicon carbide nanorods" Chemical Physics Letters, vol. 265, Issues 3-5, Feb. 7, 1997, pp. 374-378.
Legba "Synthesis and Characterization of a-Silicon Carbide Nanostructures" University of Kentucky Master's Theses 2007.
Li, et al. "Silicon-based Nanomaterials" Springer Series in Materials Science vol. 187, 2013.
Abstract Only Sun et al. "Formation of Silicon Carbide Nanotubes and Nanowires via Reaction of Silicon (from Disproportionation of Silicon Monoxide) with Carbon Nanotubes" J. Am. Chem. Soc. 2002, 124(48), pp. 14464-14471.
Tan et al. "Properties of Silicon Carbide Nanotubes formed via Reaction of SiO Powder with SWCNTs and MWCNTs" IEEE Southeastcon 2009, Mar. 5-8, 2009.
Zhang et al. "Synthesis and Characterization of Crystalline Silicon Carbide Nanoribbons" Nanoscale Res. Lett. (2010) 5:1264-1271.

* cited by examiner

COMPOSITE ARTICLES COMPRISING METAL CARBIDE FIBERS

CROSS-REFERENCE TO RELATED APPLICATION

The present application is a divisional of U.S. patent application Ser. No. 14/615,685 filed Feb. 6, 2015 entitled "METAL CARBIDE FIBERS AND METHODS FOR THEIR MANUFACTURE"; which claims the benefit of U.S. Provisional Patent Application Ser. No. 61/941,001, filed Feb. 18, 2014, entitled "FABRICATION OF CONTINUOUS METAL CARBIDE FIBERS," the disclosure of each of which is herein incorporated by reference in its entirety.

INCORPORATION BY REFERENCE

The direct conversion process and metallic carbide fibers described in this disclosure are distinct from U.S. Pat. No. 8,940,391 to Garnier et al., entitled "METHODS OF PRODUCING SILICON CARBIDE FIBERS, SILICON CARBIDE FIBERS, AND ARTICLES INCLUDING SAME," from U.S. patent application Ser. No. 12/901,326 to Garnier et al. "CLADDING MATERIAL, TUBE INCLUDING SUCH CLADDING MATERIAL AND METHODS OF FORMING THE SAME," and U.S. patent application Ser. No. 13/215,967 to Garnier et al., entitled "METHODS OF PRODUCING CONTINUOUS BORON CARBIDE FIBERS, CONTINUOUS BORON CARBIDE FIBERS, CONTINUOUS FIBERS COMPRISING BORON CARBIDE, AND ARTICLES INCLUDING FIBERS COMPRISING AT LEAST A BORON CARBIDE COATING, each of which are assigned to the Assignee of the present application (Advanced Ceramic Fibers, LLC). The disclosure of each of the above referenced applications is incorporated by reference herein in its entirety.

BACKGROUND OF THE INVENTION

1. The Field of the Invention

The present invention relates to a conversion process starting with carbon fiber to produce partial metal carbide/carbon fibers and/or fully converted individual metal carbide fibers including calcium carbide, rare earth carbides, other metal carbides, and unique combinations of metal carbides, such as calcium carbide, rare earth carbides, other metal carbides, and optionally carbon (as an unreacted core) in a continuous or discontinuous fiber in a high purity form that is not obtainable using other processes today. More specifically, the invention, in various embodiments, relates to methods of producing metal carbides in continuous or other fiber forms, and articles including at least one or both of the continuous and/or discontinuous (chopped) metal carbide fibers and various weaves, braids and tubes of metal carbide fibers.

2. The Relevant Technology

There is a need today for economical metal carbide/carbon and metal carbide fibers as reinforcing fibers or as the base materials that in their respective current monolithic metal carbide form, have thousands of scientific and industrial uses. For example, lanthanide monolithic carbide compounds are used as catalysts in the production of petroleum and synthetic products. They are also used in lamps, lasers, magnets, phosphors, motion picture projectors, and X-ray intensifying screens. A pyrophoric mixed rare-earth alloy called Mischmetal (50% Ce, 25% La, 25% other light lanthanides) or misch metal is combined with iron to make flints for cigarette lighters. The addition of <1% Mischmetal or lanthanide silicides improves the strength and workability of low alloy steels. Several of the rare earths in current monolithic forms are also used in nuclear applications for their characteristic of high (Dy, Gd, Eu, Sin) or respectively low (Yb, La, Pr, Tb, Er, Tm) neutron cross section. In a continuous or chopped or milled fiber form, metal carbide fibers which are subjects of this invention can be woven into various forms for use in metal matrix composites, polymer matrix composites, and ceramic matrix composites having similar or compatible matrix such as silicon carbide, cerium carbide, hafnium carbide, etc.

Current metal carbides (MC) comprise or consist of chemically bonded metal (M) and carbon (C) atoms in a monolithic (non-fiber) form and exhibit beneficial properties, such as high hardness, high temperature stability, low electrical resistivity, and high resistance to corrosion and oxidation. Like diamond, a pure carbon compound, monolithic metal carbide compounds tend to be extremely hard, refractory and resistant to wear, corrosion, and heat. Due to these properties, monolithic metal carbides have current and potential uses in a palette of applications including coatings, rocket nozzles, optical coatings, electronic contacts, diffusion barriers, drill bits, and cutting tools. Other useful characteristics include a high temperature melting point, toughness, electrical conductivity, low thermal expansion and abrasiveness. Coatings of metal carbide have been formed on substrates by physical and chemical deposition techniques, such as pulsed laser deposition, reactive laser ablation, ultrahigh vacuum sputter deposition, high current plasma discharge arc deposition, co-evaporation, chemical vapor deposition, electron beam deposition, and ion beam assisted deposition applications including alloying agents with metals and ceramics, coatings for drills and other tools.

Currently, there are no known methods of forming metal carbides such as those contemplated herein, in fiber form, other than silicon carbide, boron carbide, and perhaps hafnium carbide and tantalum carbide. It would be an advancement in the art to provide metal carbides other than these carbides, in fiber form. It would be a further advancement if such could be provided through an economical process.

BRIEF SUMMARY

The following Table 1 lists the fiber forms of metal carbides that can be made under this invention and applications which include metal carbide fiber reinforcements in metal composites, ceramic composites, polymer composites, and metal+ceramic composites.

The metal carbides including, calcium carbide, rare earth metal carbides, and others have a variety of properties. For example, calcium carbide has been used as a reducing agent, and is available in powder or crystalline form. Rare earth carbides have been used in magnets, neutron capture masers, ceramic capacitors, battery electrodes, fluid catalytic cracking, hydrogen storage, mercury vapor lamps, and emitters in projection televisions. Rare earth carbides are available in monolithic (non-fiber), powder and sometimes in nanoparticle forms, such as rare earth carbide powders for use as dopants in ceramic or steel materials. Monolithic (non-fiber) forms of rare earth carbide materials are usable at temperatures of up to at least 2000° C. in an inert environment. However, with the exception of silicon carbide and boron carbide, and perhaps hafnium carbide and tantalum carbide, all the other metal carbides are not currently available in a fiber form, particularly in a commercial manner.

MATECH, Inc. reports making of HfC and TaC fibers using preceramic polymer shaped into a continuous fiber. The fabrication process of HfC and TaC ceramic fibers is based on melt spinning hafnium or tantalum containing preceramic polymer, extruding that polymer through an orifice to form fiber, cross-linking that fiber and heating the cross-linked fiber under controlled atmospheric conditions at a temperature greater than 600° C. to obtain a hafnium carbide containing ceramic fiber comprised of polycrystalline HfC or TaC grains, respectively. [Reference: United States Patent Application Publication No. 20020142148. Hilmas, Gregory E.; et al., Oct. 3, 2002, Continuous composite co-extrusion methods, apparatuses, and compositions U.S. Pat. No. 4,825,647]. The presence of the polycrystalline grains in these HfC and TaC fibers limits the use temperature to below that which the grains will consolidate and grow, e.g., about 1500 degrees C. Theses fibers do not have an internal carbon core nor are made using the unique processing methods described herein.

This invention to produce metal carbide fibers will "significantly expand" the number of metal carbide fiber and composite applications in respective transportation, infrastructure, industrial, defense, energy and nuclear arenas. In particular, metal carbide fibers exhibit high mechanical performance and high temperature resistance which will provide the needed breakthroughs for Ultrahigh Temperature Materials. For example, alpha SiC fibers have inherent single-phase materials and are capable of operating at temperatures from 1500° C. to 3000° C., while maintaining structural integrity within Metal Matrix Composite (MMC) or Ceramic Matrix Composite (CMC) materials. Other metal carbide fibers such as HfC and TaC fibers have an inherent capability to achieve even higher temperatures. Another advantage of metal carbide fibers—they can be directly processed into melted metals which is a problem with carbon fibers (because of formation of brittle carbide phases that results in poor quality of the resulting composite). For example, the metal carbide fiber may be embedded in a matrix of metal, forming a MMC. Similarly, the metal carbide fibers may be embedded in a matrix of ceramic, forming a CMC. Other matrix composite materials may also be possible (e.g., where the metal carbide fibers are embedded or otherwise disposed within a carbon matrix, or a matrix of another material (e.g., polymer, etc.).

The thirty-five (35) specific metal carbide (MC) fibers described in this disclosure are listed in alphabetic order in Table 1. The stoichiometry of individual metal carbide when directly converted from the starting carbon fiber to a partial or fully converted metal carbide fiber can range from $M_xC_y$ where $x=y=1$ for tungsten carbide (WC) (Table 1, number 30) to values of $x=1$ and $y=2$ ($MC_2$), $x=2$ and $y=2$ ($M_2C_2$), $x=2$ and $y=3$ ($M_2C_3$), and other higher x and y values for metal carbides as listed in Table 1, column 5. For example, as seen in Table 1, the values of x and y may range from 1 to 12. Specific examples of such metal carbides that may be prepared in fiber form are shown in column 5 of Table 1.

Table 1 includes metal carbides starting with aluminum carbide ($Al_4C_3$) to zirconium carbide (ZrC). These carbides are in alphabetic order: aluminum ($Al_4C_3$), beryllium ($Be_2C$), boron ($B_4C$ to $B_{12}C$), calcium (CaC, $CaC_6$), cerium (CeC, $CeC_2$), chromium ($Cr_3C_2$), dysprosium ($DyC_2$), erbium ($ErC_2$), europium ($EuC_2$), gadolinium ($GdC_2$ and $Gd_2C_2$), hafnium ($HfC_2$), holmium ($Ho_3C_2$), iron ($Fe_2C$, $Fe_3C$, $Fe_7C$), lanthanum ($LaC_2$), lithium ($Li_4C$), magnesium ($Mg_2C$), manganese (MnC), molybdenum (MoC), niobium (NbC, $NbC_2$), neodymium ($Nd_4C_3$), praseodymium ($PrC_2$), samarium ($SmC_2$), scandium ($ScC_2$) silicon (SiC), tantalum (TaC), terbium ($TbC_2$), thulium ($TmC_2$), thorium (ThC), titanium (TiC), tungsten (WC), uranium (UC and $UC_2$), vanadium ($V_4C_3$), ytterbium ($YbC_2$), yttrium ($YC_2$), and zirconium (ZrC). Some of these metal carbides are in a class commonly known as the "rare earth" carbides. These are: cerium (CeC, $CeC_2$), dysprosium (DyC), erbium ($ErC_2$), europium ($EuC_2$), gadolinium ($GdC_2$ and $Gd_2C_2$), holmium ($Ho_3C_2$), lanthanum ($LaC_2$), niobium (NbC, $NbC_2$), neodymium ($Nd_4C_3$), praseodymium ($PrC_2$), samarium ($SmC_2$), scandium ($ScC_2$) thulium ($TmC_2$), terbium ($TbC_2$), ytterbium ($YbC_2$), and yttrium ($YC_2$), respectively. Others of the metals listed in Table 1 belong to the class of alkali metals (e.g., lithium), alkaline earth metals (e.g., beryllium, magnesium, calcium), transition metals (e.g., titanium, vanadium, chromium, manganese, iron, hafnium, molybdenum, tantalum, tungsten, and zirconium), post-transition metals (e.g., aluminum), metalloids (e.g., boron, silicon), or actinides (e.g., thorium, uranium), as will be apparent to anyone familiar with the periodic table. For simplicity, each may be referred to as metals (or metal oxides) as described herein in the context of the present methods for converting the metals (or metal oxides) and a carbon fiber source material into the corresponding metal carbide.

In an embodiment, the preferred process for the formation of metal carbide fibers is the co-reaction of the respective metal vapor (M) with carbon (C) fiber in a controlled atmosphere system at various elevated temperatures where the partial pressure of the metal vapor present in the reaction zone is at least 0.0001 atmospheres to 5 atmospheres with the preferred pressure of 0.1 to 1 atmosphere. The second preferred process for formation of metal carbide fibers is the co-reaction of the respective metal oxide vapor (MO) with carbon (C) fiber in a controlled atmosphere system at various elevated temperatures where the partial pressure of the metal oxide vapor present in the reaction zone is at least 0.0001 atmosphere to 5 atmospheres with the preferred pressure of 0.1 to 1 atmosphere. The total pressure in the reaction zone may be from 0.1 to 5 atmospheres, from 0.1 to 1 atmosphere, or about 1 atmosphere.

The extent of the reaction process between the metal vapor (M) or the metal oxide vapor (MO) and carbon fiber (C) to form the MC fiber is kinetically driven and can be increased by either increasing the processing temperature or increasing the reaction time or both. Therefore, increasing the temperature will increase the metal vapor pressure available to react with the carbon fiber forming a partially converted MC/C fiber, which eventually becomes a fully converted MC fiber if conversion of the carbon fiber proceeds to completion. The temperature of formation for the reaction M+C→MC (or similar reaction based on metal oxide) is based in the theory of irreversible thermodynamics. This means that the "arrow" points only in one direction, and the kinetics or rate of the reaction depends on the manner that M (or MO) and C are brought together to react, which details are described in the present disclosure. As described herein, if the temperature of reaction were above the dissociation temperature of the metal carbide, then the reaction can go in the opposite direction, which would be undesirable.

Other than the availability of silicon carbide fiber and boron carbide fibers from distinctly different fiber formation processes involving use of fiber drawn organic precursors such as polycarbosilanes (in formation of SiC fiber) or chemical vapor deposition methods in forming $B_4C$ coated carbon fiber (commonly called SCS-6 fiber), the inventor has not found any literature or patents related to the fabrication of any of the metal carbide fibers (other than the Inventor's own SiC methods described in the above referenced Patent or Patent Applications, and the Inventor's own boron carbide methods described in U.S. patent application Ser. No. 13/215,967, herein incorporated by reference in its entirety) shown in Table 1 from the process proposed in the present invention. While the Inventor's prior work with SiC fibers may now be recognized as analogous to some of the additional presently described embodiments directed to production of other metal carbides, there was no teaching or suggestion at the time of those references (or even thereafter, until now) that an analogous process might be useful in the production of different metal carbide fibers. It is only in the present disclosure that this benefit has been first realized. In addition, the present disclosure provides alternative methods (e.g., including immersion of the carbon fiber in a bath composition as part of a preconversion step) for conversion of the carbon fiber to a silicon carbide or other metal carbide fiber.

In an embodiment, the invention is based on formation of the respective metal or metal oxide vapors by heating the metal to its respective vaporization point (starting near the melting point of the metal or metal oxide) in the presence of a continuous carbon fiber being drawn through the reaction zone and by controlling the reaction, forming partially converted fibers (MC/C) or fully converted fibers (MC) by controlling the temperature and time of exposure (residence time) of the carbon fiber to the metal or metal oxide vapor.

The present invention relates to a process for the direct production of novel metal carbide fibers from co-reaction of the metal and/or metal oxide vapor with carbon fiber. The process is more economical as compared to alternate processes such as chemical vapor deposition, sputtering or sintering of organic precursors such as polycarbosilane. In the present process, we may start with high purity carbon fibers (formed by conversion of a precursor such as rayon, mesophase petroleum pitch or polyacrylonitrile (PAN) polymer using well-known technology) and gaseous metal materials known to form metal carbides. The carbon fiber is then co-reacted in a controlled gaseous high temperature environment, chamber, zone or enclosure and has surprisingly been found to yield a metal carbide fiber as the carbon of the fiber itself is converted through reaction with the gaseous metal or metal oxide, into the metal carbide. Reaction has been observed to occur from the exterior of the fiber towards the interior, so that if the conversion reaction is not permitted to proceed to completion, the outer portions of the carbon fiber are converted, while the interior carbon core remains unreacted, forming a metal carbide fiber with an unreacted carbon core. If reaction proceeds to full conversion of the carbon material in the fiber, no such unreacted carbon core is present, but the full thickness of the fiber is converted to metal carbide, and may surround a hollow core. With the exception of silicon carbide and boron carbide fibers, other metal carbide fibers are not known to be commercially available today.

TABLE 1

Metal Carbides (MC) and End Use Applications in the Novel Fiber Form for Fully Converted MC Fibers and Partially Converted MC/C(core) Fibers. See References below for additional information.

| # | Metal Name | Metal | Metal Tmelt (° C.) | Convert C to MC[1] | End-Use Applications[2] |
|---|---|---|---|---|---|
| 1 | Aluminum | Al | 660 | $Al_4C_3$ | Reinforcement fiber used in cutting tools and catalysis in hydrolysis to methane. |
| 2 | Beryllium | Be | 1287 | $Be_2C$ | Reinforcement fiber used as catalysis in hydrolysis to methane and as composite material in mirrors (strength and low expansion) |
| 3 | Boron | B | 2076 | $B_4C$ to $B_{12}C$ | Reinforcing fiber used in metals and ceramics for strength and light weight |
| 4 | Calcium | Ca | 842 | $CaC_2$, $CaC_6$ | Reinforcing fiber used as a reducing agent in filters |
| 5 | Cerium | Ce | 795 | $CeC_2$ | Reinforcing fiber used in metals and glass composites |
| 6 | Chromium | Cr | 1907 | $Cr_3C_2$ | Reinforcement fiber used in metal and ceramic cutting tools |
| 7 | Dysprosium | Dy | 1407 | $DyC_2$ | Reinforcing fiber as a neutron adsorber in metals |
| 8 | Erbium | Er | 1529 | $ErC_2$ | Reinforcing fiber in metals as a low neutron adsorber |
| 9 | Europium | Eu | 826 | $EuC_2$ | Reinforcing fiber as a neutron adsorber in metals |
| 10 | Gadolinium | Gd | 1312 | $GdC_2$ | Reinforcing fiber as a neutron adsorber in metals |
| 11 | Hafnium | Hf | 2758 | HfC | Reinforcing fiber in MMC and CMC composites |
| 12 | Holmium | Ho | 1461 | $Ho_3C_2$ | Reinforcing fiber used in metals and ceramic for high strength magnetics and as a catalysis filter |
| 13 | Iron | Fe | 1538 | $Fe_2C$, $Fe_3C$, $Fe_7C$ | Reinforcing fiber used in metals for mechanical strength and high corrosion resistance, cutting tool |

TABLE 1-continued

Metal Carbides (MC) and End Use Applications in the Novel Fiber
Form for Fully Converted MC Fibers and Partially Converted MC/C(core)
Fibers. See References below for additional information.

| # | Metal Name | Metal | Metal Tmelt (° C.) | Convert C to MC[1] | End-Use Applications[2] |
|---|---|---|---|---|---|
| 14 | Lanthanum | La | 920 | $LaC_2$ | Reinforcing fiber as catalyst in chemical processing |
| 15 | Lithium | Li | 180 | $Li_4C_3$ | Reinforcing fiber used in composites for batteries |
| 16 | Magnesium | Mg | 650 | $Mg_2C_3$ | Reinforcing fiber used in metals for high strength, light weight, high corrosion resistance, cutting tool |
| 17 | Manganese | Mn | 1246 | MnC | Reinforcing fiber for corrosion resistance, cutting tool |
| 18 | Molybdenum | Mo | 2623 | MoC | Reinforcing fiber for corrosion resistance, cutting tool |
| 19 | Niobium | Nb | 2477 | $Nb_4C_3$ | Reinforcing fiber used in metal tool bits, alloying and fiber reinforced magnets |
| 20 | Neodymium | Nd | 1021 | $Nd_4C_3$ | Reinforcing fiber used in fiber reinforced magnets |
| 21 | Praseodymium | Pr | 935 | $PrC_2$ | Reinforcing fiber as low neutron adsorber in metals |
| 22 | Samarium | Sm | 1072 | $SmC_2$ | Reinforcing fiber as neutron adsorber in metals |
| 23 | Scandium | Sc | 1541 | $ScC_2$ | Reinforcing fiber in aluminum alloy composites |
| 24 | Silicon | Si | 1414 | SiC | Reinforcing fiber used in metals and ceramic for mechanical strength, corrosion resistance and hardness |
| 25 | Tantalum | Ta | 3027 | TaC | Reinforcing fiber used in metals and ceramics for corrosion resistance, cutting tool |
| 26 | Terbium | Tb | 1356 | $TbC_2$ | Reinforcing fiber as low neutron adsorber in Zr and Al metals/alloys |
| 27 | Thulium | Tm | 1545 | $TmC_2$ | Reinforcing fiber used in metals as a low neutron adsorber |
| 28 | Thorium | Th | 1750 | ThC | Reinforcing fiber used in metals and ceramic as a nuclear carbide fuel |
| 29 | Titanium | Ti | 1668 | TiC | Reinforcing fiber used in metals and ceramics for high corrosion resistance, cutting tool |
| 30 | Tungsten | W | 3422 | WC | Reinforcing fiber used in metals and ceramics for high corrosion resistance, cutting tool |
| 31 | Uranium | U | 1132 | UC, $UC_2$ | Reinforcing fiber used as a nuclear carbide fuel |
| 32 | Vanadium | V | 1910 | $V_4C_3$ | Reinforcing fiber in metal cutting tools |
| 33 | Ytterbium | Yb | 824 | $YbC_2$ | Reinforcing fiber as low neutron adsorber in Zr and Al metals/alloys |
| 34 | Yttrium | Y | 1526 | $YC_2$ | Reinforcing fiber used as catalyst and as a superconductor wire |
| 35 | Zirconium | Zr | 1855 | ZrC | Reinforcing fiber used as a low neutron adsorber, corrosion resistance in metals and ceramics |

[1]Convert Carbon to Metal Carbide (MC), either through full conversion (resulting in the metal carbide MC in fiber form) or partial conversion (resulting in the metal carbide MC over an unconverted carbon core (MC/C(core)).
[2]End-Use Applications for MC fiber and MC/C fiber. All applications include either MC and/or MC/C as reinforcing fiber in metal, ceramic, or other composites.
Reference [1]Greenwood, Norman N.; Earnshaw, Alan (1984). Chemistry of the Elements. Oxford: Pergamon Press. pp. 318-22. ISBN 0-08-022057-6.
Reference [2]Peter Ettmayer & Walter Lengauer (1994). "Carbides: transition metal solid state chemistry". In R. Bruce King. Encyclopedia of Inorganic Chemistry. John Wiley & Sons. ISBN 0-471-93620-0.

According to an embodiment, one method comprises reaction between a carbon fiber material and a metal or metal oxide source material (reactant) at a temperature greater than a melting temperature of the metal or metal oxide source material. In an embodiment, the reaction temperature is not only above the melting temperature, but above the vaporization point of the metal or metal oxide material and maintained below the dissociation temperature of the respective metal carbide being formed. The metal (M) or metal oxide (MO) source material may be selected from the group consisting of: aluminum (to form $Al_4C_3$), beryllium (to form $Be_2C$), calcium (to form $CaC$ and/or $CaC_6$), cerium (to form $CeC$ and/or $CeC_2$), chromium (to form $Cr_3C_2$), dysprosium (to form $DyC_2$), erbium (to form $ErC_2$), europium (to form $EuC_2$), gadolinium (to form $GdC_2$ and/or $Gd_2C_2$), hafnium (to form $HfC_2$), holmium (to form $Ho_3C_2$), iron (to form $Fe_2C$, $Fe_3C$, and/or $Fe_7C$), lanthanum (to form $LaC_2$), lithium (to form $Li_4C_3$), magnesium (to form $Mg_2C_3$), manganese (to form $MnC$), molybdenum (to form $MoC$), niobium (to form $NbC$ and/or $NbC_2$), neodymium (to form $Nd_4C_3$), praseodymium (to form $PrC_2$), samarium (to form $SmC_2$), scandium (to form $ScC_2$), tantalum (to form $TaC$), terbium (to form $TbC_2$), thulium (to form $TmC_2$), thorium (to form $ThC$), titanium (to form $TiC$), tungsten (to form $WC$), uranium (to form $UC$ and/or $UC_2$), vanadium (to form $V_4C_3$), ytterbium (to form $YbC_2$), yttrium (to form $YC_2$) zirconium (to form $ZrC$), oxides thereof, and combinations thereof. As will be apparent, in an embodiment, oxides of any of the above metals may also be used to form the metal carbide. As described in the inventor's earlier applications, such processes may also be used where the metal or metal oxide source material is silicon (to form $SiC$), boron (to form $B_4C$ to $B_{12}C$), or oxides thereof.

Another embodiment of the disclosure includes another method of forming metal carbide fibers. The method comprises immersing a carbon fiber material in a solution comprising at least one of metal particles or metal oxide particles followed by a temperature driven reaction between the metal and/or metal oxide particles with carbon of the carbon fiber material, maintained below the dissociation temperature of the respective metal carbide being formed. The metal or metal oxide particles may be selected from the group consisting of: aluminum (to form $Al_4C_3$), beryllium (to form $Be_2C$), boron (to form $B_4C$ to $B_{12}C$), calcium (to form $CaC$ and/or $CaC_6$), cerium (to form $CeC$, and/or $CeC_2$), chromium (to form $Cr_3C_2$), dysprosium (to form $DyC_2$), erbium (to form $ErC_2$), europium (to form $EuC_2$), gadolinium (to form $GdC_2$ and/or $Gd_2C_2$), hafnium (to form $HfC_2$), holmium (to form $Ho_3C_2$), iron (to form $Fe_2C$, $Fe_3C$ and/or $Fe_7C$), lanthanum (to form $LaC_2$), lithium (to form $Li_4C$), magnesium (to form $Mg_2C$), manganese (to form $MnC$), molybdenum (to form $MoC$), niobium (to form $NbC$ and/or $NbC_2$), neodymium (to form $Nd_4C_3$), praseodymium (to form $PrC_2$), samarium (to form $SmC_2$), scandium (to form $ScC_2$) silicon (to form $SiC$), tantalum (to form $TaC$), terbium (to form $TbC_2$), thulium (to form $TmC_2$), thorium (to form $ThC$), titanium (to form $TiC$), tungsten (to form $WC$), uranium (to form $UC$ and/or $UC_2$), vanadium (to form $V_4C_3$), ytterbium (to form $YbC_2$), yttrium (to form $YC_2$) and zirconium (to form $ZrC$), respectively. Of course, oxides of such metals may also be used. Combinations of any such metals or metal oxides may also be used.

Yet another embodiment of the disclosure includes metal carbide fibers comprising a metal carbide material that results from full or partial conversion of the carbon fiber material. When fully converted, the fiber may include a hollow core (e.g., metal carbide filaments of the fiber may surround a hollow core). The metal carbide material is in fiber form (e.g., including filaments formed of grains of the metal carbide) and is a carbide of a metal selected from the group consisting of: aluminum ($Al_4C_3$), beryllium ($Be_2C$), boron ($B_4C$ to $B_{12}C$), calcium ($CaC$, $CaC_6$), cerium ($CeC$, $CeC_2$), chromium ($Cr_3C_2$), dysprosium ($DyC_2$), erbium ($ErC_2$), europium ($EuC_2$), gadolinium ($GdC_2$ and $Gd_2C_2$), hafnium ($HfC_2$), holmium ($Ho_3C_2$), iron ($Fe_2C$, $Fe_3C$, $Fe_7C$), lanthanum ($LaC_2$), lithium ($Li_4C$), magnesium ($Mg_2C$), manganese ($MnC$), molybdenum ($MoC$), niobium ($NbC$, $NbC_2$), neodymium ($Nd_4C_3$), praseodymium ($PrC_2$), samarium ($SmC_2$), scandium ($ScC_2$) silicon ($SiC$), tantalum ($TaC$), terbium ($TbC_2$), thulium ($TmC_2$), thorium ($ThC$), titanium ($TiC$), tungsten ($WC$), uranium ($UC$ and $UC_2$), vanadium ($V_4C_3$), ytterbium ($YbC_2$), yttrium ($YC_2$) zirconium ($ZrC$), and combinations thereof.

Yet, still another embodiment of the disclosure includes partially converted metal carbide fibers comprising a metal carbide material over a carbon fiber material (i.e., present as an unreacted core). The metal carbide material is in fiber form (e.g., including filaments formed of grains of the metal carbide) and is a carbide of a metal selected from the group consisting of: aluminum ($Al_4C_3$), beryllium ($Be_2C$), boron ($B_4C$ to $B_{12}C$), calcium ($CaC$, $CaC_6$), cerium ($CeC$, $CeC_2$), chromium ($Cr_3C_2$), dysprosium ($DyC_2$), erbium ($ErC_2$), europium ($EuC_2$), gadolinium ($GdC_2$ and $Gd_2C_2$), hafnium ($HfC_2$), holmium ($Ho_3C_2$), iron ($Fe_2C$, $Fe_3C$, $Fe_7C$), lanthanum ($LaC_2$), lithium ($Li_4C$), magnesium ($Mg_2C$), manganese ($MnC$), molybdenum ($MoC$), niobium ($NbC$, $NbC_2$), neodymium ($Nd_4C_3$), praseodymium ($PrC_2$), samarium ($SmC_2$), scandium ($ScC_2$) silicon ($SiC$), tantalum ($TaC$), terbium ($TbC_2$), thulium ($TmC_2$), thorium ($ThC$), titanium ($TiC$), tungsten ($WC$), uranium ($UC$ and $UC_2$), vanadium ($V_4C_3$), ytterbium ($YbC_2$), yttrium ($YC_2$) zirconium ($ZrC$) carbide, and combinations thereof.

Another embodiment of the disclosure includes an article comprising metal carbide fibers dispersed in a matrix. The metal carbide fibers comprise one or more metal carbide fibers where the metal of the metal carbide is selected from the group consisting of: aluminum ($Al_4C$), beryllium ($Be_2C$), boron ($B_4C$ to $B_{12}C$), calcium ($CaC$, $CaC_6$), cerium ($CeC$, $CeC_2$), chromium ($Cr_3C_2$), dysprosium ($DyC_2$), erbium ($ErC_2$), europium ($EuC_2$), gadolinium ($GdC_2$ and $Gd_2C_2$), hafnium ($HfC_2$), holmium ($Ho_3C_2$), iron ($Fe_2C$, $Fe_3C$, $Fe_7C$), lanthanum ($LaC_2$), lithium ($Li_4C_3$), magnesium ($Mg_2C_3$), manganese ($MnC$), molybdenum ($MoC$), niobium ($NbC$, $NbC_2$), neodymium ($Nd_4C_3$), praseodymium ($PrC_2$), samarium ($SmC_2$), scandium ($ScC_2$) silicon ($SiC$), tantalum ($TaC$), terbium ($TbC_2$), thulium ($TmC_2$), thorium ($ThC$), titanium ($TiC$), tungsten ($WC$), uranium ($UC$ and $UC_2$), vanadium ($V_4C_3$), ytterbium ($YbC_2$), yttrium ($YC_2$), zirconium ($ZrC$) carbide, and combinations thereof.

With the exception of silicon carbide fiber, boron carbide fiber, and perhaps hafnium carbide fiber and tantalum carbide fiber, no metal carbide fibers are available today in commercial form. Some of these other metal carbide materials are available, but only as lump (monolithic), powder or nano material forms only. A process for formation of an alpha silicon carbide material in the form of continuous micron diameter fiber is found in U.S. patent application Ser. No. 12/901,309 to Garnier et al., entitled "METHODS OF PRODUCING SILICON CARBIDE FIBERS, SILICON CARBIDE FIBERS, AND ARTICLES INCLUDING SAME," now U.S. Pat. No. 8,940,391. We select at least one member of the following group as candidate metallic carbide fibers: aluminum carbide ($Al_4C_3$), beryllium carbide ($Be_2C$), calcium carbide ($CaC$ and/or $CaC_6$), cerium carbide ($CeC$ and/or $CeC_2$), chromium carbide ($Cr_3C_2$), dysprosium carbide ($DyC_2$), erbium carbide ($ErC_2$), europium carbide ($EuC_2$), gadolinium carbide ($GdC_2$ and/or $Gd_2C_2$), hafnium carbide ($HfC_2$), holmium carbide ($Ho_3C_2$), iron carbide ($Fe_2C$, $Fe_3C$, and/or $Fe_7C$), lanthanum carbide ($LaC_2$), lithium carbide ($Li_4C$), magnesium carbide ($Mg_2C$), manganese carbide (MnC), molybdenum carbide (MoC), niobium carbide (NbC and/or $NbC_2$), neodymium carbide ($Nd_4C_3$), praseodymium carbide ($PrC_2$), samarium carbide ($SmC_2$), scandium carbide ($ScC_2$) tantalum carbide (TaC), terbium carbide ($TbC_2$), thulium carbide ($TmC_2$), thorium carbide (ThC), titanium carbide (TiC), tungsten carbide (WC), uranium carbide (UC and/or $UC_2$), vanadium carbide ($V_4C_3$), ytterbium carbide ($YbC_2$), yttrium carbide ($YC_2$) zirconium carbide (ZrC), or combinations thereof. Where a combination of metallic carbides is to be formed, silicon carbide (SiC) and/or boron carbide ($B_4C$ to $B_{12}C$) may also be included.

As distinct forms, the group called rare earth metallic carbides are also solid solutions of C in the rare earth metal, forming different discrete compounds such as MC, $MC_2$, and $M_2C_3$ depending on the rare earth metallic cation, with $MC_2$ typically being the most stable form (with exception of holmium sesquicarbide, $Ho_2C_3$, which is most stable for Ho). The rare earth metal cations are: cerium (Ce), europium (Eu), ytterbium (Yb), lanthanum (La), praseodymium (Pr), neodymium (Nd), samarium (Sm), gadolinium (Gd), terbium (Tb), dysprosium (Dy), holmium (Ho), erbium (Er), scandium (Sc), yttrium (Y), and thulium (Tm). The rare earth carbides can have various crystalline forms such as $YbC_2$ (hexagonal), $LaC_2$ (tetragonal); $TbC_2$ (rhombohedral as TbC and tetragonal as $TbC_2$); $ErC_2$ (hexagonal alpha used as dopant in electronic grade alpha SiC fibers). Articles and patents on the rare earth carbides cover their formation in powder or nano particle form or as combinations of compounds in the monolithic form only. No patents, articles, or other disclosure for calcium or rare earth carbides in fiber forms have been found.

There is a need for affordable metal carbide fibers (e.g., continuous or in other forms) in many cross-over industrial and military applications including nuclear structural applications such as cutting tools ($Cr_3C_2$, $Mg_2C$, MnC, MoC, SiC, WC), fuel cladding (SiC, etc.), channel and other supporting structure inside the reactor core regions. Other application examples include: Rare-earth magnets ($GdC_2$, $DyC_2$, $SmC_2$, $NdC_2$), neutron capture masers ($SmC_2$), chemical reducing agents, vanadium steel ($ErC_2$), ceramic capacitors ($NdC_2$), battery-electrodes ($LaC_2$), fluid catalytic cracking ($LaC_2$), hydrogen storage ($LaC_2$), chemical reducing agents ($YbC_2$), mercury vapor lamps ($EuC_2$), and emitters in projection televisions ($TbC_2$). Some of the rare-earth metal carbides also exhibit high melting points thus being candidate materials in various high temperature ceramic matrix composite (CMC) application areas including nuclear, aerospace and novel thermoelectric generators as the fiber forms become available. Today, the entire ceramic fiber composites industry is (in general terms) based on use of beta-SiC and boron carbide fibers or other oxide based fibers such as aluminum oxide.

Whereas patents have been issued on conversion of metals into metallic carbides, no patent, patent application, journal article, or other disclosure of which we are aware teaches the novel manner of processing disclosed herein to form metal carbide fibers in submicron to micron size diameter form. By way of non-limiting example fiber diameter may range from 0.1 μm to 100 μm. Based on this knowledge, we conclude that this invention is novel. For the class of metal carbides we are focusing on the formation of the respective metal carbides from direct reaction of the respective gaseous metal, gaseous metal oxide, or nanosize metal oxide particles, with one or more of carbon nanotubes, fullerenes, or other carbon fiber. For example, the carbon fiber starting material may be in any of various forms, including but not limited to carbon nanotubes, fullerenes, commercially available carbon fiber tow materials, or even carbon fiber materials yet to become available. Such carbon fiber starting material may be in the form of a continuous carbon fiber (e.g., such as can be drawn through the reaction zone), in chopped or milled form (e.g., fed or otherwise introduced into the reaction zone (e.g., on a conveyor or similar structure)

Minor adjustments in the basic process (e.g., involving temperature and/or residence time in the reaction zone) may be necessary for each metal carbide, as the metal and metal oxide species vapor pressures are different for different metals, which will affect the kinetics of chemical conversion of carbon filaments into metal carbide filaments. For each metal, the process will yield an end product having various materials compositions ranging from an outer dense fine grain (e.g., average grain size of less than 1 μm) metal carbide layer over a non-reacted carbon fiber core to a fully densified fine grain metal carbide fiber. In some embodiments, a hollow core may be formed. Given this direct conversion process with no significant shrinkage relative to the carbon fiber core starting material (e.g., not greater than 0.1%), the end product will have desirable properties for applications which are specific to each metal carbide.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. It should be noted that the figures are not necessarily drawn to scale, and that elements of similar structure or function are generally represented by like reference numerals for illustrative purposes throughout the figures. These drawings depict only certain embodiments of the invention and are not therefore to be considered to be limiting of its scope.

DETAILED DESCRIPTION OF THE PREFERRED EMBODIMENTS

I. Introduction

Figure 1:
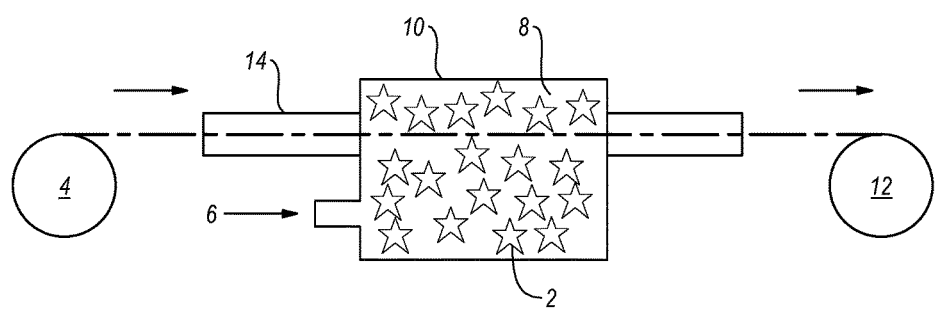
FIG. 1 is a schematic illustration of a reaction chamber utilized in a method to form metal carbide fibers according to an embodiment of the disclosure.

Methods of forming at least one of calcium carbide or other metal carbide in fiber form are disclosed, as are metal carbide fibers. In addition, articles including the metal carbide fibers are disclosed. As used herein, the term "metal carbide" means and includes a chemical compound having at least one metal atom and at least one carbon atom, as indicated by the chemical formula $M_xC_y$, where x is 1 or 2, and y is 1, 2, or 3, or x and/or y are any of the values shown in Table 1. For convenience, the term "metal carbide" is used herein to collectively refer to calcium carbide, the rare earth carbides, and other carbides listed in Tables 1-2. The metal carbide may also be indicated herein by the terms "MC," "$MC_2$," "$M_2C_2$," "$M_2C_3$,", etc. where M is the metal (calcium or rare earth, or other metal) cation. By way of example, the metal carbide may include, but is not limited to: aluminum carbide ($Al_4C_3$), beryllium carbide ($Be_2C$), boron carbide ($B_4C$ to $B_{12}C$), calcium carbide (CaC and/or $CaC_6$), cerium carbide (CeC, $CeC_2$), chromium carbide ($Cr_3C_2$), dysprosium carbide ($DyC_2$), erbium carbide ($ErC_2$), europium carbide ($EuC_2$), gadolinium carbide ($GdC_2$ and/or $Gd_2C_2$), hafnium carbide ($HfC_2$), holmium carbide ($Ho_3C_2$), iron carbide ($Fe_2C$, $Fe_3C$, and/or $Fe_7C$), lanthanum carbide ($LaC_2$), lithium carbide ($Li_4C_3$), magnesium carbide ($Mg_2C$), manganese carbide (MnC), molybdenum carbide (MoC), niobium carbide (NbC and/or $NbC_2$), neodymium carbide ($Nd_4C_3$), praseodymium carbide ($PrC_2$), samarium carbide ($SmC_2$), scandium carbide ($ScC_2$) silicon carbide (SiC), tantalum carbide (TaC), terbium carbide ($TbC_2$), thulium carbide ($TmC_2$), thorium carbide (ThC), titanium carbide (TiC), tungsten carbide (WC), uranium carbide (UC and/or $UC_2$), vanadium carbide ($V_4C_3$), ytterbium carbide ($YbC_2$), yttrium carbide ($YC_2$) zirconium carbide (ZrC) carbide, and combinations thereof.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term may be used in preference to the perhaps more restrictive term "is" so as to avoid any implication that other, compatible materials, structures, features and methods usable in combination therewith should or must be, excluded. Of course, it will be appreciated that use of the term "is" does not necessarily implicate that other materials, structures, features, or methods are excluded.

II. Exemplary Metal Carbides and Methods of Manufacture

In an embodiment, to form the metal carbide fibers, a gaseous metal species and a carbon fiber material are reacted according to Reactions 1 and 2 with the preferred reaction being number 2.

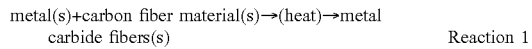

metal(s)+carbon fiber material(s)→(heat)→metal carbide fibers(s)     Reaction 1

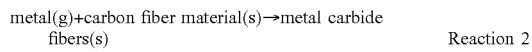

metal(g)+carbon fiber material(s)→metal carbide fibers(s)     Reaction 2

The metal carbide fibers may be directly formed from the carbon fiber material by vaporizing a metal source material (metal (s) in Reaction 1) to form the gaseous metal species (metal (g) in Reaction 2), and reacting the gaseous metal species with the carbon fiber material. As used herein, the term "directly formed" means and includes formation of the metal carbide fibers from a carbon fiber feedstock material without requiring additional post-processing acts. Vaporization of the metal source material (Reaction 2) produces an environment containing metal atoms in gaseous form. As the metal source material is heated to a temperature greater than its vaporization point (when possible) or at least to its melting point, the gaseous metal species are formed and react with the carbon fiber material.

Unfortunately, not all of these metals reach their boiling or vaporization point (boiling and vaporization point or temperature may be used interchangeably herein) for realistic operational temperature range below 3000° C. (exceptions are Ca with boiling point 1484° C., Eu (1597° C.), Sm (1791° C.), Yb (1194° C.), and Tm (1947° C.)). For metals that reach the boiling point, the metal vapor pressure is much higher than for metals that do not reach it. For the latter it may be advisable to operate below the vaporization point (but above the melting point) and take into account the fact that metal vapor pressure is lower for them, i.e., the process of carbon fiber conversion takes much longer relative to if the temperature were raised to above the vaporization point. That said, reaction kinetics are also dependent on temperature, so that in the formation of metal carbide fibers for metals or metal oxides having relatively higher vaporization temperatures, the reaction time increase resulting from lower vapor pressure of the source material (e.g., metal or metal oxide) may be at least partially counteracted by the relatively higher temperature. In a typical example, reaction time will range from seconds to minutes (e.g., 1 second to 60 minutes, 2 seconds to 40 minutes, 5 seconds to 30 minutes, or 10 seconds to 10 minutes) to achieve partial, or even full conversion. The process is much faster than many other processes, even those for forming SiC fiber. In addition, the process can be conducted as a continuous, rather than batch process (e.g., by drawing or otherwise feeding the carbon fiber starting material into the reaction zone).

Exceptions on use of metal vapor are noted in Table 2. An alternative method to form metal carbide fibers can use the gaseous metal oxide species and a carbon fiber material that are reacted according to Reactions 3 and 4 with the preferred reaction being number 4.

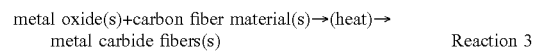

metal oxide(s)+carbon fiber material(s)→(heat)→metal carbide fibers(s)     Reaction 3

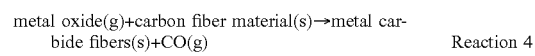

metal oxide(g)+carbon fiber material(s)→metal carbide fibers(s)+CO(g)     Reaction 4

The metal carbide fibers may be directly formed from the carbon fiber material by vaporizing a metal oxide source material (metal oxide (s) in Reaction 3) to form the gaseous metal oxide species (metal oxide (g) in Reaction 4), and reacting the gaseous metal oxide species with the carbon fiber material. As used herein, the term "directly formed" means and includes formation of the metal carbide fibers from a carbon fiber feedstock material without additional post-processing acts. In addition, no particular pre-processing (e.g., oxidative activation of the carbon fiber) steps are required either. The carbon fiber feedstock material may simply be as provided from the manufacturer in either sized or unsized composition, because the sizing may be "burned off" prior to reaching the reaction chamber or reaction temperature. Vaporization of the metal oxide source material (Reaction 4) produces an environment containing metal oxide in gaseous form. As the metal oxide source material is heated to a temperature greater than its vaporization point (when possible) or at least its melting point, the gaseous metal oxide species are formed and react with the carbon fiber material.

When reaction between metal vapor and carbon occurs, no secondary gases (byproducts) are produced in reaction number 2. The reaction is a gas-solid phase reaction that results in the formation of the metal carbide fibers by an irreversible surface chemical exchange reaction between the carbon fiber material and gaseous metal species. Reactions 1 and 2 are thermodynamically and kinetically driven and their rate is a function of the reaction temperature, reaction time, and relative mole fractions of the gaseous metal species and carbon fiber material (e.g., conditions within the reaction zone). The carbon fiber material may be partially converted or fully converted to metal carbide, with conversion of the carbon (e.g., present as filaments of carbon in the carbon fiber) to metal carbide filaments so that the fiber thus becomes a metal carbide fiber, as described in detail below. Depending on the reaction temperature and reaction time, conversion may be partial or complete. When reaction between metal oxide vapor and carbon occurs, a secondary gas (byproduct) of carbon monoxide is produced in this reaction number 4. The reaction is a gas-solid phase reaction that results in the formation of the metal carbide fibers by an irreversible surface chemical exchange reaction between the carbon fiber material and the metal oxide species. Reactions 3 and 4 are thermodynamically and kinetically driven and their rate is a function of the reaction temperature, reaction time, and relative mole fractions of the gaseous metal species and carbon fiber material (e.g., conditions within the reaction zone). The carbon fiber material may be partially converted or fully converted to metal carbide fiber, as described in detail below, depending on the reaction temperature and reaction time. In the same way as described above, the filaments of carbon in the carbon fiber are progressively converted to metal carbide, retaining the fiber, filament, structure of the starting carbon fiber material. Conversion proceeds from the exterior inwardly, so that a partially converted fiber includes the outer portion of the carbon fiber converted to metal carbide, with the interior core remaining as unreacted carbon fiber. In any case, it is not a deposition of metal carbide onto the carbon fiber, but actual conversion of the carbon fiber itself.

The gaseous metal species may be produced from a metal or metal oxide source material, such as an elemental form of the metal, or an oxide compound of the metal. The metal source material may be a high purity solid, such as plate, lump, powder, nanoparticles, or other solid form of the metal. By way of example, the metal source material may be greater than approximately 90% pure, such as greater than approximately 95% pure or greater than approximately 99% pure. The solid metal source may be a high purity powder commercially available from a chemical supply company, such as from Sigma-Aldrich Co. (St. Louis, Mo.). Combinations of different solid metal (or metal oxide) source materials may be used. In such cases, the purity of the source material may be as above, relative to the mixture (e.g., little or no materials other than the desired metals or metal oxides are present).

The resulting metal carbide fibers are typically in the same general form as the starting carbon fiber material, but for at least some of the carbon having been converted to metal carbide. In an embodiment, the metal carbide fibers are continuous fibers. As used herein, the terms "continuous fibers" or "continuous metal carbide fibers" mean and include fibers that may be formed or manufactured to an indefinite length and, thus, are not process-constrained to any particular length other than a length of carbon fiber material feedstock employed. By way of example, the continuous fibers may have a length ranging from five centimeters to a length of greater than 100 meters or more. The term "continuous fibers" is used in contrast to discontinuous fibers, which have a discrete length as formed or manufactured, such as a length of less than e.g., five centimeters. The metal carbide fibers may be formed from individual filaments having a diameter of from approximately 0.1 µm to 100 µm, or 1 µm to approximately 100 µm (e.g., 2 µm to 20 µm). In one embodiment, the metal carbide filaments have a diameter of from approximately 8 µm to approximately 10 µm. The metal carbide fibers in tow form may include a count of from approximately 100 individual filaments to approximately 50,000 individual filaments based upon presently commercially available carbon fiber tow feedstocks, but otherwise are not limited. Future available tow sizes could be in excess of 50,000 filaments. In one non-limiting application, the metal carbide fibers may be formed into weavable filament fiber tow form or the carbon fiber feed stock may be available pre-woven in a variety of braids, weaves or tubular forms. Such woven, braided, or other interlocked fiber forms may be fed into the reaction zone in a similar manner, and converted to metal carbide fiber (e.g., either fully or partially converted).

The carbon fiber material may be a carbonaceous material and may contain carbon in the form of graphite plates (e.g., graphene). The carbon fiber material may include microscopic crystals axially aligned in long chains, such as in a polyaromatic hydrocarbon (e.g., pitch resin) or a polyacrylonitrile (PAN) processed carbon. Exemplary pitch resin fibers may be mesophase pitch, isotropic pitch, rayon-based fibers, or gas-phase grown fibers. The carbon fiber material may include an allotrope of carbon, such as graphite, lonsdaleite, or amorphous carbon. The carbon fiber material may include carbon nanotubes or fullerenes (e.g., $C_{60}$, $C_{70}$, $C_{540}$) into which the gaseous metal species diffuse during the conversion reaction. The carbon fiber material may include fibers of the carbon fiber material coated with carbon nanotubes, fullerenes, or other forms of carbon. Such a coating of carbon nanotubes or fullerenes over a core of carbon fiber material may be of sufficient thickness to substantially cover the carbon fiber material.

The carbon fiber material may be a multi-filament carbon tow and have individual filament diameters of from approximately 1 µm to approximately 100 µm. The diameter of the carbon filaments may be selected based on the desired diameter of the metal carbide filaments to be formed. If continuous metal carbide fibers are to be formed, the carbon fiber material may be configured as continuous fibers (e.g., fibers that may be formed or manufactured to an indefinite length) rather than as discontinuous (e.g., chopped, milled, etc.) fibers. The carbon fiber material may be of sufficient length to be fed or drawn through a reaction chamber (e.g., furnace) in which the reaction is conducted (e.g., as a continuous process). For shorter fiber lengths (e.g., chopped, milled, etc. discontinuous fibers), it may still be possible to conduct the conversion reaction as a continuous process, e.g., by feeding the carbon fiber material through the reaction zone of the reaction chamber on a conveyor or similar conveyance mechanism. The carbon fiber material may be substantially pure in that the material predominantly includes carbon and hydrogen. By way of example, the carbon fiber material may have a purity of greater than approximately 99.5%. To prevent the formation of whiskers, minimal impurities (on the order of less than parts per million (ppm) (e.g., less than 1000 ppm, less than 500 ppm, less than 100 ppm, less than 50 ppm, less than 25 ppm, less than 10 ppm, less than 5 ppm, less than 1 ppm), such as iron, may be present in the carbon fiber material. Large quantities of suitable carbon fiber materials are commercially available.

By way of non-limiting example, the carbon fiber material may be a pitch-based resin, such as continuous pitch-based carbon fibers available from KUREHA Corporation (Tokyo, Japan) under the name SY-652 pitch based carbon yarn or from Mitsubishi Chemical U.S.A., Inc. (Tokyo, Japan) under the DIALEAD® tradename, such as DIALEAD® KS352U pitch-based carbon fibers. The carbon fiber material may also be a PAN-based carbon fiber, such as AS4C-GP and AS2C-GP or other carbon fibers available from HEXCEL Corporation (Salt Lake City, USA), T300 or other carbon fibers available from Toray Carbon Fibers America, Inc. (Santa Ana, Calif.), or SGL SIGRAFIL® carbon fibers available from SGL Carbon Fibers Ltd. (Gardena, Calif.). Of course, various other carbon fiber feedstock materials may be employed. Such materials may be any of those commercially available, those which are not commercially available (e.g., specially prepared), or elongate carbon fiber materials which become available at some future time. As mentioned, any elongate carbon fiber materials, including carbon nanotubes, fullerenes, carbon fiber tow, etc. can be used.

In addition to the gaseous metal and/or metal oxide species that is present during the reaction, an inert carrier gas may also be used. The carrier gas may provide for movement of the gaseous metal and/or metal oxide species in the reaction chamber. The carrier gas may also be used to maintain a low partial pressure of oxygen ($PO_2$) in the reaction chamber. The carrier gas may be a high purity, inert gas such as argon having a low residual oxygen content ($PO_2$), a low nitrogen content ($PN_2$), and a low water content ($PH_2O$), with each species at a relative partial pressure of less than approximately $1.01 \times 10^2$ Pascal (0.001 atm). Each of the oxygen, nitrogen, or water in the carrier gas may be present at a concentration of less than approximately 1000 parts per million (ppm). The reaction kinetics favors a slower diffusion of metal atoms into the carbon fiber material and a faster diffusion of the carbon out of the carbon fiber material, that results in a "hollow" fiber upon full conversion. Removal of such carbon may occur at the surface of the carbon fiber material if residual oxygen is present in the reaction chamber. Thus, residual oxygen in the reaction chamber should be kept to a minimal (part per million) amount to avoid excessive carbon removal.

For example, oxygen concentration in the carrier gas in the reaction chamber may be less than 1000 ppm, less than 500 ppm, less than 100 ppm, less than 50 ppm, less than 25 ppm, or less than 10 ppm). The same values may similarly apply to any nitrogen or water in the carrier gas of the reaction chamber. Nitrogen and/or water in the carrier gas may be maintained at even lower levels (e.g., less than 5 ppm, less than 1 ppm). As described below, a very small fraction of oxygen may be provided in the reaction chamber, to facilitate removal of one carbon atom from the carbon fiber feedstock material for each carbon atom of the carbon fiber feedstock material that is converted to metal carbide. The carrier gas may include one or more noble inert gases (e.g., including, but not limited to, argon, helium, neon, xenon, or combinations thereof). By utilizing an inert carrier gas of high purity, the resulting metal carbide fibers may include relatively low concentrations of impurities, such as oxygen or nitrogen, which if present may lower both thermal and mechanical properties of the metal carbide fibers and may be a source of swelling during use of the metal carbide fibers.

The conversion of carbon fibers in Reaction 2 is influenced by the volumetric effect. Every time a metal atom reacts with carbon material of the fiber, the fiber gets an additional atom that needs to be accommodated. There is no mechanism for some carbon atoms to leave the fiber and to be substituted by metal atoms, unless an additional amount of controlled oxygen is provided in the reaction zone. In Reaction 4, for each MC molecule producing reaction, one carbon atom is released from the carbon fiber feedstock material in the form of carbon monoxide (CO), which release provides the necessary volume expansion space so as to accommodate the metal atom. This is explained in more detail below.

One preferred method is to use mainly turbostratic (e.g., where basal planes of the carbon material have slipped out of alignment) carbon fibers made of PAN precursor. According to one theory, it is clear that metal atoms cannot directly go into dense carbon structure (e.g., a graphene sheet) because of the large (up to 60%) increase in metal-carbon bond length versus carbon-carbon bond length in the carbon structure. Also, such is energetically unfavorable because the binding energy of carbon in dense carbon structure is quite high. Therefore, metal atoms can be attached only to the edges or defects (e.g., voids) of carbon structure (e.g., graphene ribbons). This means that carbon fiber material with a significant number of defects would be more preferable for Reaction 2 than high quality graphite fiber where the number of carbon structural defects is minimal and all carbon atoms are of the sp2 orbital bonding type. The turbostratic carbon forms where many carbon ribbons with defects are stacked layer by layer and are arranged without any strict order would be preferable for metal diffusion inside the fiber material and for forming bonds between metal and carbon atoms. In addition to existing structural defects in carbon fiber material, one could think about forming new defects by etching existent carbon fiber in an oxygen atmosphere under controlled time and temperature conditions before conducting it into the reaction zone for reaction with metal vapor. Of course, in other embodiments, no such oxidation of the carbon fiber starting material is employed.

A solution to the problem of volumetric expansion of the initial carbon fiber may be significantly facilitated in the reaction between metal vapor and carbon if instead of elemental metal vapor in Reaction 2, one would employ the metal oxide vapor in the process: MO (gas)+2C (solid)→MC (solid)+CO (gas), which provides an alternate mechanism for removing some carbon atoms from the fiber material and substituting them with metal atoms. However, corresponding melting points for some of the contemplated rare earth metals oxides and calcium oxide are much higher (e.g., lying between 2200° C. and 2500° C.) than melting points of the corresponding elemental metals. Operating at such high temperatures often requires additional restrictions for the materials used in making the reaction chamber and other device components which are able to operate in such high temperature conditions. At lower temperatures, the vapor pressure of metal oxides will be related to the sublimation of the material from a solid, and are negligible.

The carbon fiber material is drawn or otherwise fed through the reaction zone of the reaction chamber, which is described in more detail below in regard to FIG. 1. Reaction occurs as the carbon fiber material is drawn or fed through the reaction chamber containing the gaseous metal and/or metal oxide species. The carrier gas is flowed into the reaction chamber at a sufficient flow rate to achieve the desired gaseous environment within the reaction chamber. The flow rate of the carrier gas at standard temperature and pressure conditions may range from 0.001 $m^3$/min to 0.01 $m^3$/min. Depending on the length of the reaction zone, which may range from inches to feet (e.g., 5 inches to 50 feet, (e.g., 500 inches for large scale commercial production)), the draw rate of the carbon fiber material through the reaction chamber may be from approximately 0.1 inch/minute to approximately 500 inches/min. or more. By way of example, for a 6-inch long reaction zone, the draw rate may range from approximately 0.1 inch/minute to approximately 10 inches/minute to achieve partially or fully converted metal carbide fibers. Relatively slower draw rates (e.g., 0.1 inch/min) may be sufficient to achieve full conversion. The reaction zone of the reaction chamber may be maintained at a temperature sufficient for the gaseous metal and/or metal oxide species to be formed from the metal and/or metal oxide source material and for the gaseous metal and/or metal oxide species and carbon fiber material to react, such as at a temperature between approximately 700° C. and approximately 2100° C., depending on the specific metal used. Depending on the reaction temperature, reaction time (time during which the fiber remains in the reaction zone), gaseous environment, relative mole fractions of the gaseous metal and/or metal oxide species and carbon fiber material, and the form of the initial carbon fiber material, the carbon fiber material may be partially converted or fully converted to metal carbide fiber.

During the reaction, carbon diffuses out of the carbon fiber material while metal atoms and/or metal oxide molecules of the gaseous metal species diffuse into the carbon fiber material and react with the carbon, forming the metal carbide fibers. The respective diffusions of the metal and/or metal oxide and carbon may continue until approximately 50% of the carbon diffuses outward from the interior of the carbon fiber material, while the other approximately 50% of the carbon (at full conversion of the fiber) reacts to form the metal carbide.

Due to the high surface area of the carbon fiber material and the small geometric diameter of the carbon fiber material (typically 3-10 microns, 3-5 microns, 3-4 microns, or 8-10 microns), the reaction may proceed to completion in an amount of time ranging from approximately seconds to approximately minutes depending on the length of the heated reaction zone. For example, reaction time may range from 1 second to 60 minutes, 2 seconds to 40 minutes, 5 seconds to 30 minutes, or 10 seconds to 10 minutes) to achieve partial, or even full conversion. However, the reaction time may also vary depending on whether partially converted metal carbide fibers or fully converted metal carbide fibers are to be formed (e.g., complete or relatively more complete conversion taking longer than relatively less complete conversion).

Reaction with the metal atoms (or metal oxide molecules) from the gaseous metal or metal oxide species occurs, resulting in formation and growth of sub-micron (e.g., less than 1 μm) grains of the metal carbide within the filaments of the carbon fiber material. The fine grain structure is believed to provide individual filaments of the resulting metal carbide fibers with mechanical strength. During the conversion process by metal or metal oxide vapor, the carbon core in a partially converted fiber is also responsible for the mechanical strength of the fiber, and remains inside the fiber, covered by a layer of the converted metal carbide portion of the fiber. For example, partially converted alpha silicon carbide fiber may retain about 80% or 85% (e.g., 80-85%) of the strength of an unconverted carbon fiber starting material. A fully converted silicon carbide fiber may retain about 25 to 30% of the strength of the unconverted carbon fiber starting material. For example, given a 500 ksi carbon fiber, a fully converted fiber may retain about 125 to about 150 ksi.

Other metal carbide fibers are expected to similarly retain about 80% of the strength of the starting fiber (e.g., at least about 15%, at least about 20%, at least about 25%, at least about 30%, at least about 40%, at least about 50%, at least about 70%, at least about 80% of the strength of the starting carbon fiber), depending on the degree of conversion. The various proposed end use applications may dictate the particular characteristics of the initial carbon fiber feedstocks to be converted. Each reaction of metal and/or metal oxide with the underlying carbon fiber may produce a somewhat different result, but the partial conversion is expected retain strength values noted above (e.g., approximately 80%) of the strength of the underlying carbon fiber. Stated another way, in some embodiments, for partial or full conversion of the carbon fiber, the reduction in strength of the converted (e.g., fully or partially converted) may be no more than about 50%, 30%, or 20% reduction in strength as compared to that of the starting carbon fiber.

The metal carbide fibers may initially, and transiently, be in the MC form, but may undergo transition to the $MC_2$ form (during the processing in the reaction zone), which is typically more stable at a higher temperature (at T>1500° C.). The transition to the $MC_2$ form may occur depending on the reaction temperature used and the time at the reaction temperature. By selecting the reaction temperature to be sufficiently above the vaporization temperature of the metal and/or metal oxide source material, the $MC_2$ form of the metal carbide fibers may be formed. The reactions to form the metal carbide fibers from each of the metals or metal oxides are set forth in Table 2, in addition to the chemical formulae of the resulting metal carbide forms, the crystal structures of the resulting metal carbides, and the temperature range at which the reaction may be conducted.

Some of the metal carbides dissociate or decompose at a temperature below that at which the corresponding metal oxide melts. In such cases, it may be preferable to employ the conversion reaction based on use of the metal, rather than the metal oxide. In some embodiments, the metal or metal oxide source material may be heated not quite to its melting temperature, e.g., within 100° C. of the melting temperature, as will be apparent from Table 2.

TABLE 2

Reactions to Form Calcium Carbide and Other Metal Carbide Fibers from Metal Vapor.

| # | Metal Name | Metal | M melt (° C.) | T. Range[3] | MO melt Temp (° C.) | T. Range[4] | Metal Carbides[5] |
|---|---|---|---|---|---|---|---|
| 1 | Aluminum | Al | 660 | 620 to 1200 | $Al_4C_3$ dissociates < T oxide melt | | $Al_4C_3$ |
| 2 | Beryllium | Be | 1287 | 1250 to 1800 | $Be_2C$ dissociates < T oxide melt | | $Be_2C$ |
| 3 | Boron | B | 2076 | 2000 to 2400 | 450 | 450 to 2100 | $B_4C$ to $B_{12}C$ |
| 4 | Calcium | Ca | 842 | 800 to 1600 | $CaC_2$ dissociates < T oxide melt | | $CaC_2$, $CaC_6$ |
| 5 | Cerium | Ce | 795 | 750 to 2000 | CeC dissociates < T oxide melt | | CeC, $CeC_2$ |

TABLE 2-continued

Reactions to Form Calcium Carbide and Other Metal Carbide Fibers from Metal Vapor.

| # | Metal Name | Metal | M melt (° C.) | T. Range[3] | MO melt Temp (° C.) | T. Range[4] | Metal Carbides[5] |
|---|---|---|---|---|---|---|---|
| 6 | Chromium | Cr | 1907 | 1850 to 2000 | 300 | >300 to <1000 | $Cr_3C_2$, $Cr_7C_3$ |
| 7 | Dysprosium | Dy | 1407 | 1350 to 1700 | $DyC_2$ dissociates < T oxide melt | | $DyC_2$ |
| 8 | Erbium | Er | 1529 | 1450 to 2100 | $ErC_2$ dissociates < T oxide melt | | $ErC_2$ |
| 9 | Europium | Eu | 826 | 750 to 1000 | $EuC_2$ dissociates < T oxide melt | | $EuC_2$ |
| 10 | Gadolinium | Gd | 1312 | 1250 to 2100 | $GdC_2$ dissociates < T oxide melt | | $GdC_2$ |
| 11 | Hafnium | Hf | 2758 | 2650 to 3200 | 2758 | 2700 to 3000 | HfC |
| 12 | Holmium | Ho | 1461 | 1350 to 2000 | $HoC_2$ dissociates < T oxide melt | | $Ho_3C_2$ |
| 13 | Iron | Fe | 1538 | 1450 to 2100 | 1377 | 1300 to 1600 | $Fe_2C$, $Fe_3C$, $Fe_7C$ |
| 14 | Lanthanum | La | 920 | 850 to 1600 | $LaC_2$ dissociates < T oxide melt | | $LaC_2$ |
| 15 | Lithium | Li | 180 | 120 to 800 | $Li_4C_3$ dissociates < T oxide melt | | $Li_4C_3$ |
| 16 | Magnesium | Mg | 650 | 600 to 1200 | $Mg_2C_3$ dissociates < Toxide melt | | $Mg_2C_3$ |
| 17 | Manganese | Mn | 1246 | 1150 to 1800 | 1945 | 1945 to 2200 | $MnC$, $Mn_3C$ |
| 18 | Molybdenum | Mo | 2623 | 2550 to 2900 | 1100 | 1100 to 1500 | MoC |
| 19 | Niobium | Nb | 2477 | 2350 to 3000 | NbC dissociates < T oxide melt | | NbC, $NbC_2$ |
| 20 | Neodymium | Nd | 1021 | 950 to 1600 | 2230 | 2200 to 3200 | $Nd_4C_3$ |
| 21 | Praseodymium | Pr | 935 | 850 to 1500 | $PrC_2$ dissociates < T oxide melt | | $PrC_2$ |
| 22 | Samarium | Sm | 1072 | 1000 to 1800 | $SmC_2$ dissociates < Toxide melt | | $SmC_2$ |
| 23 | Scandium | Sc | 1541 | 1500 to 2100 | 2485 | 2400 to 2600 | $ScC_2$ |
| 24 | Silicon | Si | 1414 | 1350 to 1900 | 1400 | 1400 to 2100 | SiC |
| 25 | Tantalum | Ta | 3027 | 2900 to 3400 | 1872 | 1800 to 2300 | TaC |
| 26 | Terbium | Tb | 1356 | 1300 to 1800 | $TbC_2$ dissociates < T oxide melt | | $TbC_2$ |
| 27 | Thulium | Tm | 1545 | 1450 to 2000 | 2341 | 2300 to 2500 | $TmC_2$ |
| 28 | Thorium | Th | 1750 | 1650 to 2200 | ThC dissociates < T oxide melt | | ThC |
| 29 | Titanium | Ti | 1668 | 1600 to 2000 | 1830 | 1800 to 2100 | TiC |
| 30 | Tungsten | W | 3422 | 3300 to 3600 | 1700 | 1700 to 2100 | WC |
| 31 | Uranium | U | 1132 | 1050 to 1900 | carbide dissociates < T oxide | | UC, $UC_2$ |
| 32 | Vanadium | V | 1910 | 1850 to 2400 | 690 | 650 to 1100 | $V_4C_3$ |
| 33 | Ytterbium | Yb | 824 | 750 to 1600 | $YbC_2$ dissociates < T oxide melt | | $YbC_2$ |
| 34 | Yttrium | Y | 1526 | 1450 to 2100 | $YC_2$ dissociates < T oxide melt | | $YC_2$ |
| 35 | Zirconium | Zr | 1855 | 1855 to 2200 | 2715 | 2715 to 3000 | ZrC |

[3] Metal Process (Equation 2) M + C → MC. An exemplary Temperature Range (° C.) is provided in this column.
[4] Metal Oxide Process (Equation 4) MO + 2C → MC + CO. An exemplary Temperature Range (° C.) is provided in this column.
[5] Metal Carbides formed as the carbon fiber is converted are provided in this column.
* When the dissociation temperature for the metal carbide is lower than the temperature at which the oxide melts, the preferred conversion process favors the metal vapor reaction (Equation 2) over the oxide vapor reaction (Equation 4).

For example, if cerium (#5 in Table 2) and the carbon fiber material react at approximately 800° C. or higher, CeC may initially be formed. However, by raising the reaction temperature to greater than approximately 1100° C., the more stable form of $CeC_2$ may be formed. While the temperature above which each of the described metal carbides converts from the MC form to the other forms may not be known, the temperature above which the $MC_2$, $M_2C_2$, $M_2C_3$, etc. forms are formed may be determined by conducting the reactions in Table 1 and varying the reaction temperature within the temperature range in Table 1, along with the amount of time at the reaction temperature and the draw or feed rate. The $MC_2$ form of the metal carbide fibers may be more stable at a temperature greater than 2200° C. compared to the $M_2C_2$ and $M_2C_3$ forms. The $MC_2$ form may also have improved mechanical strength retention at high temperature compared to the $M_2C_2$ and $M_2C_3$ forms.

Depending on the extent to which the reaction proceeds, the carbon fiber material may be fully converted or partially converted into metal carbide fiber. By adjusting the conditions within the reaction zone, such as the reaction temperature, the draw or feed rate, and/or the reaction time, the metal carbide fibers may be formed on a continuum from partially converted metal carbide fibers to fully converted metal carbide fibers. The degree of conversion may affect the tensile strength and modulus of the metal carbide fibers. The partially converted, metal carbide fibers may have a higher tensile strength than the fully converted metal carbide fibers and the fully converted fibers may have a higher modulus than the partially converted fibers. Therefore, by controlling the degree of conversion of the carbon fiber material to the metal carbide fiber material, these properties of the metal carbide fibers may be controlled.

Figure 3:
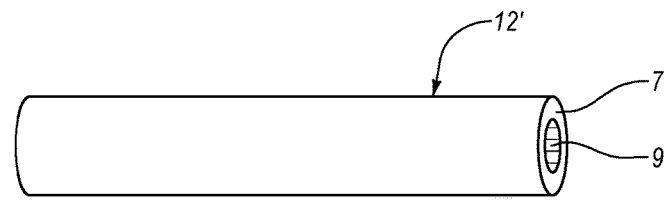
FIG. 3 is a schematic illustration of fully converted metal carbide fibers of an embodiment of the disclosure.

If the reaction conditions are such that the reaction proceeds to substantial completion, fully converted (e.g., fully dense) continuous metal carbide fibers 12' are formed, as shown in FIG. 3. The fully converted, continuous metal carbide fibers 12' may be formed by slowly pulling, drawing, or otherwise feeding the carbon fiber material through the reaction zone of the reaction chamber, which contains the gaseous metal or metal oxide species and the carrier gas. By enabling the carbon fiber material and the gaseous metal and/or metal oxide species to be in contact for a longer period of time, i.e., by increasing the reaction time or decreasing the feed rate, the carbon fiber material may be fully converted into the metal carbide fibers 12'. Since the diffusion rate of metal atoms (or metal oxide molecules) into the carbon fiber material may be lower than the diffusion rate of carbon out of the carbon fiber material, the fully converted, continuous metal carbide fibers 12' may include the metal carbide 7 surrounding a hollow core 9, which reduces the density of the continuous metal carbide fibers 12' while maintaining the mechanical strength. The hollow core 9 of the continuous metal carbide fibers 12' may have a diameter of from approximately 0.01 µm to approximately 1 µm for a carbon fiber material having a diameter of 10 µm (e.g., about 0.1% to about 10% of the fiber diameter). Such fibers may be continuous, discontinuous (e.g., chopped, milled, etc.), woven, braided, or an otherwise interlocked structure.

If present, the hollow core 9 may provide a lower mechanical strength and a higher bending radius to the metal carbide fibers 12' than the strength or bending radius of a similar, but only partially converted fiber. In one embodiment, the fully converted, metal carbide fibers 12' may be substantially homogenous metal carbide fibers, such as $CaC_2$, $CaC_6$, $CeC_2$, $EuC_2$, $YbC_2$, $LaC_2$, $PrC_2$, $NdC_2$, $SmC_2$, $GdC_2$, $TbC_2$, $DyC_2$, $Ho_3C_2$, $YC_2$, $ErC_2$, $ScC_2$ or $TmC_2$. A single fiber may include a combination of different metal carbides (e.g., by using different metal and/or metal oxide source materials, or processing a fiber using one metal or metal oxide, followed by processing using a different metal or metal oxide.

Figure 4:
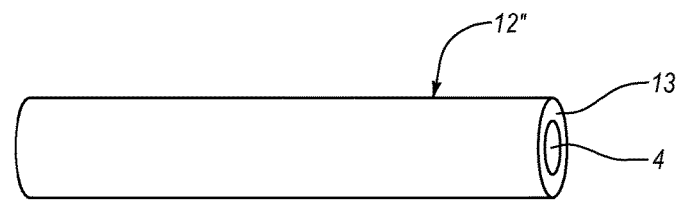
FIG. 4 is a schematic illustration of partially converted metal carbide fibers of another embodiment of the disclosure.

If the conditions within the reaction zone are maintained such that the reaction does not proceed to substantial completion, the partially converted (e.g., partially densified—the metal carbide generally has a higher density than the starting carbon fiber), metal carbide fibers 12" may be formed, as shown in FIG. 4. The partially converted, metal carbide fibers 12" may include a layer 13 (e.g., film) of metal carbide on a core of an unreacted core of carbon fiber material 4. The partially converted, metal carbide fibers 12" may be formed by relatively quickly pulling, drawing, or otherwise feeding the carbon fiber material 4 through the reaction zone of the reaction chamber, which contains the gaseous metal and/or metal oxide species and the carrier gas. The kinetics of the process (time at temperature) may be controlled by the feed rate of the carbon fiber material 4 through the reaction zone. For instance, by drawing or otherwise feeding the carbon fiber material 4 through the reaction zone more quickly, the reaction of the carbon fiber material 4 and the gaseous metal and/or metal oxide species may not proceed to completion (i.e., conversion of all carbon remaining in the fiber), forming the partially converted, metal carbide fibers 12".

The carbon fiber material 4 underlying the metal carbide converted exterior layer 13 may be substantially unreacted with the metal atoms and remain in its initial carbon form. Due to the metal carbide layer 13, the partially converted, continuous metal carbide fibers 12" may exhibit enhanced environmental oxygen protection when used at high temperatures because, in the presence of oxygen, the metal carbide layer 13 reacts with the oxygen to form an oxidative protective layer. The metal carbide layer 13 may also provide enhanced electrical conduction or magnetic field carrying capabilities to the metal carbide fibers 12". The thickness of the metal carbide layer 13 on the carbon fiber material 4 depends on the reaction time and the reaction temperature. Given a constant reactant atmosphere, the thickness of the metal carbide layer 13 also depends on the draw or feed rate of the carbon fiber material 4 through the reaction zone.

By way of example, the partially converted, metal carbide fibers 12" may include $CaC_2$ over the core of carbon fiber material 4, or $DyC_2$ over the core of carbon fiber material 4. The reaction of the carbon atoms of the carbon fiber may occur such that the carbon fiber itself acts as a template for the formation, or really conversion, of the carbon to metal carbide. Thus, the carbon fiber does not merely act as a substrate upon which the metal carbide is formed (or deposited), nor simply as a source of carbon from which the metal carbide may form, but as a fibrous template, so that the finished metal carbide product includes the same or similar filament and/or fiber structure as the original carbon fiber. The thickness of converted layer 13 may be any value up to that of full conversion. In an example, the layer 13 may be as thin as about 1 μm, 0.5 μm, 0.25 μm, or 0.1 μm. Stated another way, layer 13 may be as thin as about 10%, 5%, 2.5%, or 1% of the diameter of the overall fiber 12". Such an embodiment may provide a thin oxidation protective layer, with the unconverted carbon fiber core providing the vast majority of the strength to the resulting fiber. Such fibers may be continuous, discontinuous (e.g., chopped, milled, etc.), woven, braided, or an otherwise interlocked structure.

The reaction chamber in which the metal carbide fibers are formed may be a conventional high temperature tube furnace. The reaction chamber may be a continuous horizontal furnace or a continuous vertical furnace. Such furnaces are known in the art and, therefore, are not described in detail herein. By way of example, the reaction chamber may be a high temperature tube furnace that has been modified for continuous throughput processing of the carbon fiber material. The metal carbide fibers may be formed in the hot section tube of the furnace, which functions as the reaction zone in which the reaction temperature is controlled. By way of example, the tube may be formed from aluminum oxide, silicon carbide, boron carbide, zirconium oxide, or combinations thereof. The tube entrance and exit ports may be water-cooled to maintain the entrance and exit at room temperature during the reaction. The tube may also have end cap enclosures at both ends to enable the carrier gas to be injected into the tube and vented from the reaction chamber, and to provide an entrance port and exit port for the carbon fiber material. The atmosphere within the tube may be maintained at a slight positive pressure relative to atmospheric pressure, from approximately 0.1 psig to approximately 1 psig to prevent an external atmosphere, such as air, from entering into the tube. In an embodiment, the pressure within the tube and the reaction zone may be maintained at about 1 atmosphere.

As shown in FIG. 1, a gaseous metal and/or metal oxide species 2, the carbon fiber material 4, and a carrier gas 6 may be introduced into a reaction zone 8 of a furnace 10. The gaseous metal and/or metal oxide species 2 may be generated in situ in the furnace 10, such as by placing the metal or metal oxide source material (not shown) in the reaction zone 8 of the furnace 10 and heating the metal and/or metal oxide source material as previously described. However, the gaseous metal and/or metal oxide species 2 may also be flowed into the reaction zone 8 of the furnace 10 from an external source (not shown) of the gaseous metal and/or metal oxide species 2. The carrier gas 6 may also be flowing into the reaction zone 8 of the furnace 10. The carbon fiber material 4 may be drawn, pulled, or otherwise fed (e.g., on a conveyor) through the reaction zone 8 of the furnace 10 at a sufficient rate to enable the carbon fiber material 4 and the gaseous metal and/or metal oxide species 2 to react and form the metal carbide fibers 12, such as the fully converted, metal carbide fibers 12' or the partially converted metal carbide fibers 12". To provide sufficient time for the reaction to occur, the length of the reaction zone 8 may range from approximately five inches to approximately five hundred inches or more, the latter of which is a length of a reaction zone in an industrial scale production furnace known to be commercially available, but is not limited by the length of a reaction zone which could be built longer than 500 inches. As the process is kinetically driven, a longer reaction zone may enable the carbon fiber material 4 to be drawn through the reaction zone 8 at a faster rate. To enable individual tows, each containing multiple filaments of the carbon fiber material 4, to be separated before entering or within the furnace 10, and to increase the direct surface area exposure of the individual tows to the gaseous metal and/or metal oxide species, a tow spreader 14 may be positioned before the reaction zone 8 of the furnace 10.

Figure 2:
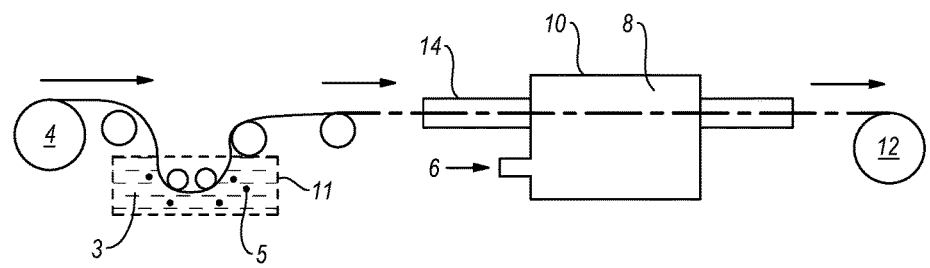
FIG. 2 is a schematic illustration of a reaction chamber utilized in a method to form metal carbide fibers according to another embodiment of the disclosure.

The metal carbide fibers may also be formed by a so-called "dip process" (Reaction 1 or 3) in which the carbon fiber material 4 is coated with particles of the metal (calcium or the rare earth), or metal oxide as shown in FIG. 2. The carbon fiber material 4 may be immersed (e.g., dipped) in a composition 3 of the metal or metal oxide particles 5. The bath composition may include a solution, suspension, dispersion, slurry, or emulsion of the metal particles 5 in water or another solvent or carrier. The particles 5 may be a solid, such as metal or metal oxide nanoparticles. Typical particle size may range from about 0.001 µm to about 1 µm, from 0.01 µm to about 0.75 µm, or from about 0.1 µm to about 0.5 µm. The composition 3 may include from approximately 40% by weight to approximately 80% by weight of the metal particles 5 (e.g., from about 50% to about 60%, or about 70% by weight). The composition may, optionally, include carbon nanotubes or fullerenes (not shown). The viscosity of the composition may be sufficiently low to permit flow of the composition and penetration into the carbon fiber material 4 but sufficiently high to adhere to the carbon fiber material 4.

The carbon fiber material 4 may be immersed in a bath 11 containing the composition 3 one or a plurality of times to form a coating or dispersion of metal or metal oxide on the carbon fiber material 4. Such a coating may have any desired thickness. After removing excess composition from the carbon fiber material 4, the water or other solvent or carrier may be removed by exposing the carbon fiber material 4 to the carrier gas 6, which is, optionally, heated. The carbon fiber material 4 coated with the metal (or metal oxide) may then be heated in the reaction zone 8 to convert it into metal carbide fibers 12' or 12". A conventional high temperature tube furnace, e.g., at a temperature between 1000° C. and 2200° C., or any values in Tables 1-2, may be used for this purpose. The total amount of metal or metal oxide particles sticking to the carbon fiber in the "dip process" may not be controlled with so high precision as in an evaporation process. Therefore, it might be expected that: (i) distribution of metal carbide across the final fiber may be less homogeneous than in an evaporation process; and, (ii) carbon fibers may be only partially converted. The metal, metal oxide, nanotube and/or fullerene coating on the carbon fiber material 4 may be beneficial in high temperature applications to provide enhanced electrical conduction or magnetic field carrying capabilities to the metal carbide fibers 12' or 12".

By way of example, to form fully converted, continuous neodymium carbide fibers, elemental neodymium may be placed in the reaction zone of the reaction chamber and the reaction zone heated to a temperature between 1021° C. and approximately 2100° C., producing some amount of neodymium atomic gas. The carbon fiber material may be drawn through the reaction zone and the neodymium gas may initially react with an outer portion of the carbon fiber material, producing a coating of neodymium carbide on the carbon fiber material, as the outer layer of the carbon fiber is converted to neodymium carbide. The neodymium may diffuse further into the carbon fiber material, continuing the conversion of the carbon fiber material to neodymium carbide. As the carbon fiber material is being converted to neodymium carbide, any carbon remaining in the carbon fiber material is substantially present in an inner core portion of the carbon fiber material. Once substantially no free carbon remains in the carbon fiber material (e.g., substantially all of the carbon fiber material has been converted to neodymium carbide), the reaction may be substantially complete and result in the formation of the fully converted, continuous neodymium carbide fibers. Examples based on each of metals 1-35 of Tables 1-2 may be conducted in a similar manner, with a change in temperature to the values shown in Tables 1-2. Further, examples based on each of metals 1-35 of Tables 1-2 may be conducted in a similar manner, but in which an oxide of the metal is used as the source material, rather than the elemental metal.

The metal carbide fibers 12' and 12" may be used in a variety of high temperature (e.g., up to approximately 2100° C., or even higher, e.g., for at least some of the carbides of refractory metals), structural applications, such as in industrial, military, nuclear, electrical, and aerospace areas. The metal carbide fibers may provide increases in thermal efficiency resulting from increased temperature capability and performance enhancements resulting from higher temperature device performance. For instance, the metal carbide fibers may be used in high field strength magnets (rare earth magnets ($GdC_2$, $DyC_2$, $SmC_2$, $NdC_2$)), permanent magnets, lasers, alloy reinforcements in steels, recording devices, electrical motors, nuclear structural applications including fuel cladding, channel and other supporting structure inside the reactor core regions, neutron capture masers ($SmC_2$), chemical reducing agents ($YbC_2$), vanadium steel (($ErC_2$), ceramic capacitors ($NdC_2$), battery-electrodes ($LaC_2$), fluid catalytic cracking ($LaC_2$), hydrogen storage ($LaC_2$), mercury vapor lamps ($EuC_2$), catalysts, flints for cigarette lighters, phosphors, motion picture projectors, X-ray intensifying screens, or emitters in projection televisions ($TbC_2$). The metal carbide fibers may also be used in high temperature, ceramic matrix composite (CMC), metal matrix composite (MMC), or other composite application areas including nuclear, aerospace and novel thermoelectric generators.

By way of example, Eu, Sm, Gd, Dy, and Sc exhibit large neutron cross sections, so the resulting carbides ($EuC_2$, $SmC_2$, $GdC_2$, $DyC_2$, and $ScC_2$) are expected to exhibit large neutron cross sections, enabling their use in various nuclear applications. Er, Ho, Yb, Ce, and Ca exhibit low thermal neutron cross sections, so the resulting carbides ($ErC_2$, $Ho_3C_2$, $YbC_2$, $CeC_2$, and $CaC_2$) are expected to exhibit low thermal neutron cross sections, enabling their use in various nuclear applications.

The metal carbide fibers, such as continuous metal carbide fibers, may be of a sufficient length to be woven, braided, or otherwise combined or interlocked with other fibers, such as silicon carbide fibers, NdC, carbon fibers, or boron carbon fibers, for use in an article or product where high heat transfer, high use temperature, or stability to nuclear radiation is desired. By way of example, the metal carbide fibers may have utility in the nuclear, aerospace, armor, heat management, marine, submarine, land transport (truck, bus, or automobile), and electronics industries, such as a fiber reinforcement in a ceramic matrix composite (CMC) or metal matrix composite (MMC). The metal carbide fibers may be used in articles including, but not limited to, heat exchangers, gas separation membranes, catalyst supports, filters, nuclear fuel containment, fusion reactor components, hot gas engines, turbine engines, hypersonic missile leading edges, tail sections, heat shields, jet vanes, space structure stabilization, chemical liners, metal matrix liners, pipes, nanoporous structures, body frames, brake pads, body armor, vehicle armor, sporting goods, drill bits, wear bits, hypersonic missiles, or rocket components, such as rocket nozzles.

In nuclear applications, the metal carbide fibers may be used in shielding, control rods, shut down pellets, fusion plasma facing components, such as radio frequency antennae, or injectors. The metal carbide fibers may, thus, be used to produce devices such as metal-ceramic or ceramic tubes to contain nuclear fuel (e.g., fissile material) and enable longer fuel use times (e.g., higher fuel burn ups) while imparting significant additional thermal and high temperature mechanical properties to the containment tube in the event of an "off-normal" event, such as loss of reactor core coolant. Given the resurgence of nuclear energy worldwide, there is a major need today for both safety and economical performance enhancements to power plant or other reactor operations. The metal carbide fibers may be incorporated in articles by conventional techniques, which are not described in detail herein, and may be selected based on the intended use of the metal carbide fibers (e.g., various methods of embedding the fibers into a matrix from which the article is formed).

Figure 5:
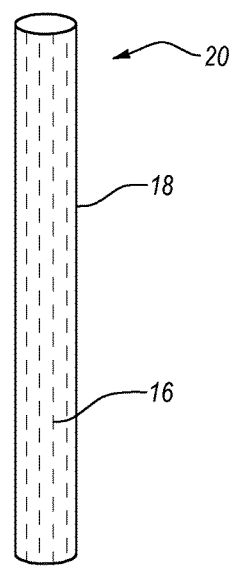
FIG. 5 is a schematic illustration of an article including metal carbide fibers in a matrix according to embodiments of the disclosure.

If the metal carbide fibers were continuous, the metal carbide fibers may be divided or cut into metal carbide fibers 16 of shorter lengths, as illustrated in FIG. 5, and utilized with a matrix 18 to form an article 20, such as a ceramic, polymer and/or metal matrix composite (CMC, PMC, or MMC), having desirable properties. Such fibers may be homogenously dispersed within the matrix. Orientation of the fibers may be random, or oriented in a particular direction, as desired. In another embodiment, some fibers may be oriented in a first direction, while others are in another direction (e.g., some parallel to a longitudinal axis of a tube or other structure, others may be oriented perpendicular to such a longitudinal axis). For convenience, the term "metal carbide fibers 16" is used to refer collectively to continuous fully or partially converted (12' and 12") metal carbide fibers that have been cut or otherwise divided into shorter lengths, but may also be woven in various braids, weaves or patterns or even in tubular configurations. Such fibers may be woven, braided, or otherwise interlocked or prepared into any shapes or structures that carbon fiber may assume.

The metal carbide fibers 16 may be dispersed or embedded within the matrix 18. The metal carbide fibers 16 may include a single metal carbide (e.g., calcium carbide, a rare earth metal carbide, or other metal carbide listed in Tables 1-2), or a combination of metal carbides, which may include silicon carbide and/or boron carbide fibers. The metal carbide fibers 16 may be incorporated into the matrix 18 by conventional techniques, which are not described in detail herein, and shaped to produce the desired article 20. The matrix 18 may be a ceramic material, a carbide (e.g., a refractory carbide) material, or a metal material including, but not limited to, boron carbide ($B_4C$), silicon carbide (SiC), hafnium carbide (HfC), titanium diboride ($TiB_2$), titanium carbide (TiC), aluminum oxide ($Al_2O_3$), boron nitride (BN), boron (B), titanium (Ti), tantalum (Ta), vanadium (V), aluminum (Al), tungsten (W), chromium (Cr), niobium (Nb), silicon (Si), nickel (Ni), lead (Pb), molybdenum (Mo), zirconium (Zr), hafnium (Hf), magnesium (Mg), or titanium aluminide ($Ti_3Al$). By way of example, molten metal infiltration techniques (e.g., Al with $CeC_2$ fibers) or spray forming techniques may be used to incorporate the metal carbide fibers 16 into the matrix 18. The matrix may not be in fiber form, e.g., in a monolithic form of sintered powder, etc.

The metal carbide fibers 16 may be used as a fiber reinforcement for ceramic or metal-ceramic articles used as nuclear control rod materials in a nuclear reactor including, but not limited to, a light water reactor (LWR), a pressurized water reactor (PWR), a liquid metal fast reactor (LMFR), a high temperature gas-cooled reactor (HTGR), or a steam-cooled boiling water reactor (SCBWR). The metal carbide fibers 16 may be used with the matrix 18 to produce articles 20, such as metal-ceramic tubes or ceramic tubes, to contain other conventional nuclear control materials. By way of example, the metal carbide fibers 16 and matrix 18 may be used to form tubes that contain metal carbide particles. The articles 20 may be more stable to irradiation than conventional articles used in the nuclear industry. Forming control rods or other tubes from the metal carbide fibers 16 and the matrix 18 may enable longer nuclear fuel use times (i.e., a higher fuel burn up), while imparting significant additional thermal and high temperature mechanical properties to the tubes in the event of a so-called "off-normal" event, such as loss of reactor core coolant.

All publications, patents and patent applications cited herein are hereby incorporated by reference in their entirety to the same extent as if each individual publication, patent or patent application was specifically and individually indicated to be incorporated by reference. For example, any of the conditions or starting materials described in the inventor's earlier applications, already referenced, may be adapted for use according to the methods, metal carbide fibers, or articles disclosed herein.

Numbers, percentages, or other values stated herein are intended to include that value, and also other values that are about or approximately the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Furthermore, the terms "substantially", "about" or "approximately" as used herein represents an amount close to the stated amount that still performs a desired function or achieves a desired result. For example, the term "substantially" "about" or "approximately" may refer to an amount that is within 10% of, within 5% of, within 1% of, within 0.1% of, and within 0.01% of a stated amount or value.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:
1. An article comprising:
   metal carbide fibers dispersed in a matrix, the metal carbide fibers comprising metal carbide in fiber form, the metal carbide comprising at least one of aluminum carbide, beryllium carbide, calcium carbide, cerium carbide, chromium carbide, dysprosium carbide, erbium carbide, europium carbide, gadolinium carbide, hafnium carbide, holmium carbide, iron carbide, lanthanum carbide, lithium carbide, magnesium carbide, manganese carbide, molybdenum carbide, niobium carbide, neodymium carbide, praseodymium carbide, samarium carbide, scandium carbide, tantalum carbide, terbium carbide, thulium carbide, thorium carbide, titanium carbide, tungsten carbide, uranium carbide, vanadium carbide, ytterbium carbide, yttrium carbide, or zirconium carbide;

wherein at least one of the metal carbide fibers includes a hollow core resulting from substantially all of a carbon fiber material having been converted to metal carbide.

2. The article of claim 1, wherein the article is one of, or a portion of an article selected from the group comprising a magnet, laser, maser, recording device, electrical motor, chemical reducing agent, ceramic capacitor, battery electrode, hydrogen storage device, mercury vapor lamp, catalyst, flint, phosphor, motion picture projector, x-ray intensifying screen, emitter in a projection television, heat exchanger, gas separation membrane, catalyst support, filter, nuclear fuel cladding, nuclear fuel containment, fusion reactor component, hot gas engine, turbine engine, hypersonic missile leading edge, tail section, heat shield, jet vane, space structure stabilization, chemical liner, metal matrix liner, pipe, nanoporous structure, body frame, brake pad, body armor, vehicle armor, sporting goods, drill bit, wear component, hypersonic missile, rocket component, or combinations thereof.

3. The article of claim 1, wherein the metal carbide fibers comprise at least one of a continuous fiber, a woven fiber or a tubular woven fiber.

4. The article of claim 1, wherein the metal carbide fiber comprises chopped, milled, or otherwise discontinuous fiber material.

5. The article of claim 1, wherein the metal carbide of the metal carbide fiber comprises metal carbide having a formula comprising at least one of MC, $MC_2$, $M_2C_2$, $M_2C_3$, or a combination thereof where M is the metal and C is carbon.

6. The article of claim 1, wherein the article further comprises at least one of boron carbide fibers or silicon carbide fibers.

7. The article of claim 1, wherein the metal carbide fibers are formed from one or more individual filaments having a diameter from approximately 2 μm to approximately 20 μm.

8. The article of claim 1, wherein the matrix comprises at least one of a ceramic material or a refractory carbide material.

9. The article of claim 1, wherein the matrix comprises at least one of a metal material or a polymer material.

10. An article comprising:
metal carbide fibers dispersed in a matrix, the metal carbide fibers comprising metal carbide in fiber form, the metal carbide comprising at least one of aluminum carbide, beryllium carbide, calcium carbide, cerium carbide, chromium carbide, dysprosium carbide, erbium carbide, europium carbide, gadolinium carbide, hafnium carbide, holmium carbide, iron carbide, lanthanum carbide, lithium carbide, magnesium carbide, manganese carbide, molybdenum carbide, niobium carbide, neodymium carbide, praseodymium carbide, samarium carbide, scandium carbide, tantalum carbide, terbium carbide, thulium carbide, thorium carbide, titanium carbide, tungsten carbide, uranium carbide, vanadium carbide, ytterbium carbide, yttrium carbide, or zirconium carbide;
wherein at least one of the metal carbide fibers includes the metal carbide in fiber form disposed over a carbon fiber material core.

11. The article of claim 10, wherein a thickness of the metal carbide is from approximately 0.001 μm to approximately 20 μm.

12. An article comprising:
metal carbide fibers dispersed in a matrix, the metal carbide fibers comprising metal carbide in fiber form disposed over a carbon fiber material core, the metal carbide comprising at least one of aluminum carbide, beryllium carbide, calcium carbide, cerium carbide, chromium carbide, dysprosium carbide, erbium carbide, europium carbide, gadolinium carbide, hafnium carbide, holmium carbide, iron carbide, lanthanum carbide, lithium carbide, magnesium carbide, manganese carbide, molybdenum carbide, niobium carbide, neodymium carbide, praseodymium carbide, samarium carbide, scandium carbide, tantalum carbide, terbium carbide, thulium carbide, thorium carbide, titanium carbide, tungsten carbide, uranium carbide, vanadium carbide, ytterbium carbide, yttrium carbide, or zirconium carbide;
wherein the matrix comprises at least one of a ceramic material, a refractory carbide material, a metal material, or a polymer material.

13. The article of claim 12, wherein the article is one of, or a portion of an article selected from the group comprising a magnet, laser, maser, recording device, electrical motor, chemical reducing agent, ceramic capacitor, battery electrode, hydrogen storage device, mercury vapor lamp, catalyst, flint, phosphor, motion picture projector, x-ray intensifying screen, emitter in a projection television, heat exchanger, gas separation membrane, catalyst support, filter, nuclear fuel cladding, nuclear fuel containment, fusion reactor component, hot gas engine, turbine engine, hypersonic missile leading edge, tail section, heat shield, jet vane, space structure stabilization, chemical liner, metal matrix liner, pipe, nanoporous structure, body frame, brake pad, body armor, vehicle armor, sporting goods, drill bit, wear component, hypersonic missile, rocket component, or combinations thereof.

14. The article of claim 12, wherein the metal carbide fibers comprise at least one of a continuous fiber, a woven fiber or a tubular woven fiber.

15. The article of claim 12, wherein the metal carbide fiber comprises chopped, milled, or otherwise discontinuous fiber material.

16. The article of claim 12, wherein the metal carbide of the metal carbide fiber comprises metal carbide having a formula comprising at least one of MC, $MC_2$, $M_2C_2$, $M_2C_3$, or a combination thereof where M is the metal and C is carbon.

17. The article of claim 12, wherein the article further comprises at least one of boron carbide fibers or silicon carbide fibers.

18. The article of claim 12, wherein the metal carbide fibers are formed from one or more individual filaments having a diameter from approximately 2 μm to approximately 20 μm.

19. The article of claim 12, wherein a thickness of the metal carbide is from approximately 0.001 μm to approximately 20 μm.

20. The article of claim 12, wherein a thickness of the metal carbide as a conversion layer over the carbon fiber material core is no more than about 10% of an overall diameter of the fiber.

* * * * *